(12) United States Patent
Otomi

(10) Patent No.: US 10,459,219 B2
(45) Date of Patent: Oct. 29, 2019

(54) EXTRANEOUS-MATTER REMOVING APPARATUS

(71) Applicant: FUJITSU TEN LIMITED, Kobe-shi, Hyogo (JP)

(72) Inventor: Masashi Otomi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 156 days.

(21) Appl. No.: 15/557,363

(22) PCT Filed: Sep. 23, 2016

(86) PCT No.: PCT/JP2016/078018
§ 371 (c)(1),
(2) Date: Sep. 11, 2017

(87) PCT Pub. No.: WO2017/115506
PCT Pub. Date: Jul. 6, 2017

(65) Prior Publication Data
US 2018/0246322 A1 Aug. 30, 2018

(30) Foreign Application Priority Data
Dec. 28, 2015 (JP) .................................. 2015-256975

(51) Int. Cl.
| G02B 27/00 | (2006.01) |
| B60S 1/54 | (2006.01) |
| B60S 1/56 | (2006.01) |
| B60S 1/68 | (2006.01) |
| H04N 5/225 | (2006.01) |
| B60S 1/48 | (2006.01) |

(Continued)

(52) U.S. Cl.
CPC .......... *G02B 27/0006* (2013.01); *B60S 1/485* (2013.01); *B60S 1/54* (2013.01); *B60S 1/56* (2013.01); *H04N 5/2171* (2013.01); *H04N 5/225* (2013.01); *H04N 7/18* (2013.01)

(58) Field of Classification Search
CPC ........ G02B 27/0006; B60S 1/485; B60S 1/54; B60S 1/56; H04N 5/2171; H04N 5/225; H04N 7/18
See application file for complete search history.

(56) References Cited

U.S. PATENT DOCUMENTS

| 7,222,388 B2 * | 5/2007 | Sugihara ................ G03B 17/56 15/310 |
| 2005/0275738 A1 * | 12/2005 | Arai ......................... B08B 5/02 348/335 |

FOREIGN PATENT DOCUMENTS

| JP | S63-028889 U | 2/1988 |
| JP | 2014-037239 A | 2/2014 |
| JP | 2016-008005 A | 1/2016 |

OTHER PUBLICATIONS

Dec. 13, 2016 International Search Report issued in International Patent Application No. PCT/JP2016/078018.

* cited by examiner

*Primary Examiner* — Dung Van Nguyen
(74) *Attorney, Agent, or Firm* — Oliff PLC

(57) ABSTRACT

A problem is for saving space of an extraneous-matter removing apparatus. In order to solve this problem, one aspect of embodiments is of an extraneous-matter removing apparatus for removing an extraneous matter attached to a camera and includes an air compressing unit. The air compressing unit includes a cylinder and a vane that is provided in the cylinder to be rotatable around a rotation axis, and ejects a compressed air generated by rotation of the vane to the camera.

15 Claims, 18 Drawing Sheets

(51) Int. Cl.
*H04N 5/217* (2011.01)
*H04N 7/18* (2006.01)

EXTRANEOUS-MATTER REMOVING APPARATUS

CROSS-REFERENCE TO RELATED APPLICATION

This application is national stage application of International Application No. PCT/JP2016/078018, filed on Sep. 23, 2016, which designates the United States, incorporated herein by reference, and which claims the benefit of priority from Japanese Patent Application No. 2015-256975, filed on Dec. 28, 2015, the entire contents of which are incorporated herein by reference.

FIELD

The embodiments discussed herein are directed to an extraneous-matter removing apparatus.

BACKGROUND

Conventionally, there is known a camera that is provided in a vehicle so as to capture an image of the vicinity of the vehicle, and the image captured by this camera is provided to a driver, for example.

An extraneous matter such as a water droplet, a snowflake, and a stain adheres in some cases to a lens of the aforementioned camera depending on effects of the weather, such as rainfall and snowfall. Therefore, there is proposed an extraneous-matter removing apparatus that ejects compressed air etc. to the lens of the camera in order to remove the extraneous matter (see Patent Literature 1, for example).

CITATION LIST

Patent Literature

Patent Literature 1: Japanese Laid-open Patent Publication No. 2014-037239

SUMMARY

Technical Problem

However, when the extraneous-matter removing apparatus has a structure for causing a piston to reciprocate in a cylinder so as to generate compressed air, for example, there exists a fear that an occupancy space of the apparatus becomes large.

In other words, in a case of the aforementioned piston structure, when air is taken into the cylinder, a shaft part that is interlocked with the piston protrudes from a profile of the cylinder, and thus an operation area for this shaft part is needed to be ensured at the periphery of the cylinder. Therefore, there exists a fear that an occupancy space of the aforementioned extraneous-matter removing apparatus is enlarged by the operation area of the shaft part, and thus there exists room for improvement in saving space.

Solution to Problem

According to one aspect of embodiments, an extraneous-matter removing apparatus for removing an extraneous matter attached to a camera and includes an air compressing unit. The air compressing unit includes a cylinder and a vane that is provided in the cylinder to be rotatable around a rotation axis, and ejects a compressed air generated by rotation of the vane to the camera.

DESCRIPTION OF EMBODIMENTS

Hereinafter, embodiments of an extraneous-matter removing apparatus according to the present disclosure will be described in detail with reference to the accompanying drawings. The present disclosure is not limited to the embodiments described in the following. Hereinafter, a case will be explained as an example, in which the extraneous-matter removing apparatus is an apparatus that is arranged in a rear part of a vehicle so as to remove an extraneous matter attached to a camera for capturing a backward image from the vehicle.

In the following, outline of a configuration of the extraneous-matter removing apparatus according to the present embodiment will be explained with reference to FIGS. 1A and 1B, and then specific configurations of the extraneous-matter removing apparatus according to the present embodiment will be explained with reference to FIG. 2 and the following.

First Embodiment

First, outline of a configuration of an extraneous-matter removing apparatus 1 according to a first embodiment will be explained with reference to FIGS. 1A and 1B.

Figure 1A:
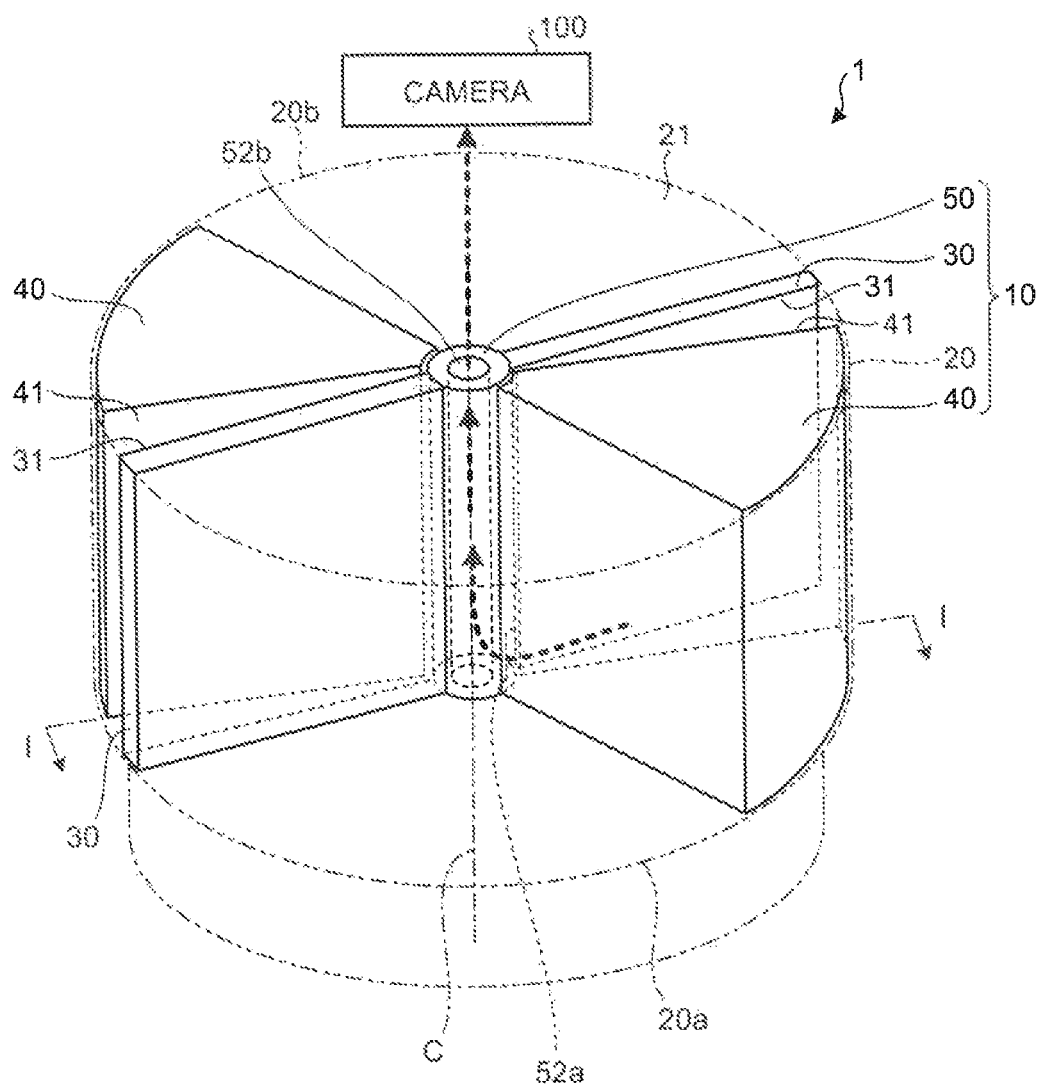
FIG. 1A is a partially-see-through perspective view illustrating outline of a configuration of an extraneous-matter removing apparatus.

FIG. 1A is a partially-see-through perspective view illustrating outline of the configuration of the extraneous-matter removing apparatus 1. FIG. 1B is a cross-sectional view taken along a line I-I in FIG. 1A, and is a diagram illustrating operations of the extraneous-matter removing apparatus 1. In FIG. 1B, when an upper-left part is assumed to be an initial state, the extraneous-matter removing apparatus 1 operates in the order of the upper-left part, an upper-right part, an lower-left part, and an lower-right part. FIGS. 1A and 1B, FIG. 2, and the following drawings are schematic diagrams.

As illustrated in FIG. 1A, the extraneous-matter removing apparatus 1 includes an air compressing unit 10. This air compressing unit 10 compresses an air so as to generate compressed air, and ejects the generated compressed air to a vehicle camera 100, which is for a vehicle, so as to remove an extraneous matter such as a water droplet attached to a lens of the camera 100.

In the drawings including FIGS. 1A and 1B, flows of the compressed airs are indicated by dashed-line arrows, and flows of intake airs to be mentioned later are illustrated by one-dot-line arrows.

Meanwhile, a conventional extraneous-matter removing apparatus has a structure for causing a piston to reciprocate in a cylinder so as to generate compressed air, and thus there exists a fear that an occupancy space of the apparatus becomes large. In other words, in a case of the piston structure, a shaft part that is interlocked with the piston protrudes from a profile of the cylinder, and thus an operation area for this shaft part is needed to be ensured at the periphery of the cylinder, whereby there exists a fear that an occupancy space is enlarged. In a case of the piston structure, an operation sound of the piston when air is compressed is relatively large in some cases.

Therefore, the extraneous-matter removing apparatus 1 according to the present embodiment is configured to save space and reduce an operation sound. In the following, a configuration of this extraneous-matter removing apparatus 1 will be explained in detail.

The air compressing unit 10 according to the present embodiment has a rotation-type compression mechanism. Specifically, as illustrated in FIG. 1A, the air compressing unit 10 includes a cylinder 20, walls 30, vanes 40, and a flow path 50. In FIG. 1A, for convenience of understanding, the cylinder 20 is indicated by two-dot lines and an inner part of the cylinder 20 is illustrated in a see-through manner.

The cylinder 20 is cylindrically formed, for example, and a cylinder chamber 21 is formed therein. This cylinder chamber 21 is provided with the above walls 30, the above vanes 40, the above flow path 50, etc.

Each of the walls 30 is formed in a plate shape, for example, and is erected and fixed in the cylinder 20. Specifically, as illustrated in the upper-left part of FIG. 1B, the walls 30 are formed so as to segment the cylindrical cylinder chamber 21 along its radial direction. Therefore, the cylinder chamber 21 is partitioned into the two cylinder chambers 21 by the walls 30.

The vanes 40 are arranged in the cylinder 20 to be rotatable around a rotation axis C. The rotation axis C of the vanes 40 is arranged coaxially with, for example, a center axis of the cylindrical cylinder chamber 21, not limited thereto. The vanes 40 are one example of a rotating body.

When seen in a rotation-axis direction, for example, each of the vanes 40 is formed in a fun shape. Each of the vanes 40 has a shape including a side surface 41 that faces a wall surface 31 of the wall 30 when the vane 40 is in an initial state of the upper-left part of FIG. 1B, in other words, is in a state before rotating. Each of the vanes 40 may have, not limited to the above shape, another shape such as a plate shape similar to that of the wall 30.

As described above, the vanes 40 are housed in the respective cylinder chambers 21 that are partitioned into two parts. Therefore, there exists the plurality of vanes 40 (in illustrated example, "two"), however, the number of the vanes 40 may be appropriately changed in accordance with the number of the cylinder chambers 21 obtained by partitioning by the one or more walls 30.

When seen in a direction along the rotation axis C, the two vanes 40 are arranged in a rotationally symmetrical arrangement. Here the number of the vanes 40 is "two", and thus it becomes n-fold rotational symmetry (n=2), in other words, point symmetry, "n" may be changed into an integer equal to or more than three in accordance with the number of the vanes 40.

The flow path 50 is configured so that compressed air flows in an inner part of the flow path 50. Specifically, as illustrated in FIG. 1A, the inner part of the flow path 50 is formed to be hollow cylindrical and the flow path 50 is formed along the rotation axis C of the vanes 40 in the cylinder 20, for example.

The flow path 50 includes (i) inlets 52a into which compressed airs flow and (ii) an outlet 52b from which the compressed air flows. The inlets 52a are formed close to a bottom surface 20a of the cylinder 20. On the other hand, the outlet 52b is formed close to a ceiling surface 20b of the cylinder 20. Thus, the air compressing unit 10 ejects compressed air in a direction along the rotation axis C of the vanes 40.

As described later, the air compressing unit 10 expands, caused by rotation of the vanes 40, rooms 22 (see upper-right part of FIG. 1B) between the side surfaces 41 and the wall surfaces 31 of the walls 30, so as to take air. In this taking of air, the outlet 52b is assumed to function as an opening through which air to be taken flows into the flow path 50, and the inlets 52a function as openings through which the taken air in the flow path 50 flows into the rooms 22. The flow path 50 is one example of a first flow path.

Next, operations of the air compressing unit 10 configured as described above will be explained with reference to FIG. 1B. First, as illustrated in the upper-left part of FIG. 1B, the vanes 40 in the initial state are assumed to be positioned so that the side surfaces 41 closely face the wall surfaces 31 of the walls 30.

Next, the vanes 40 are rotated in one direction around the rotation axis C by a drive unit 60 (see FIG. 5) to be mentioned later. As indicated by arrows D1, the above one direction is right-handed (clockwise) on the sheet of FIG. 1B, however, not limited thereto.

Figure 1B:
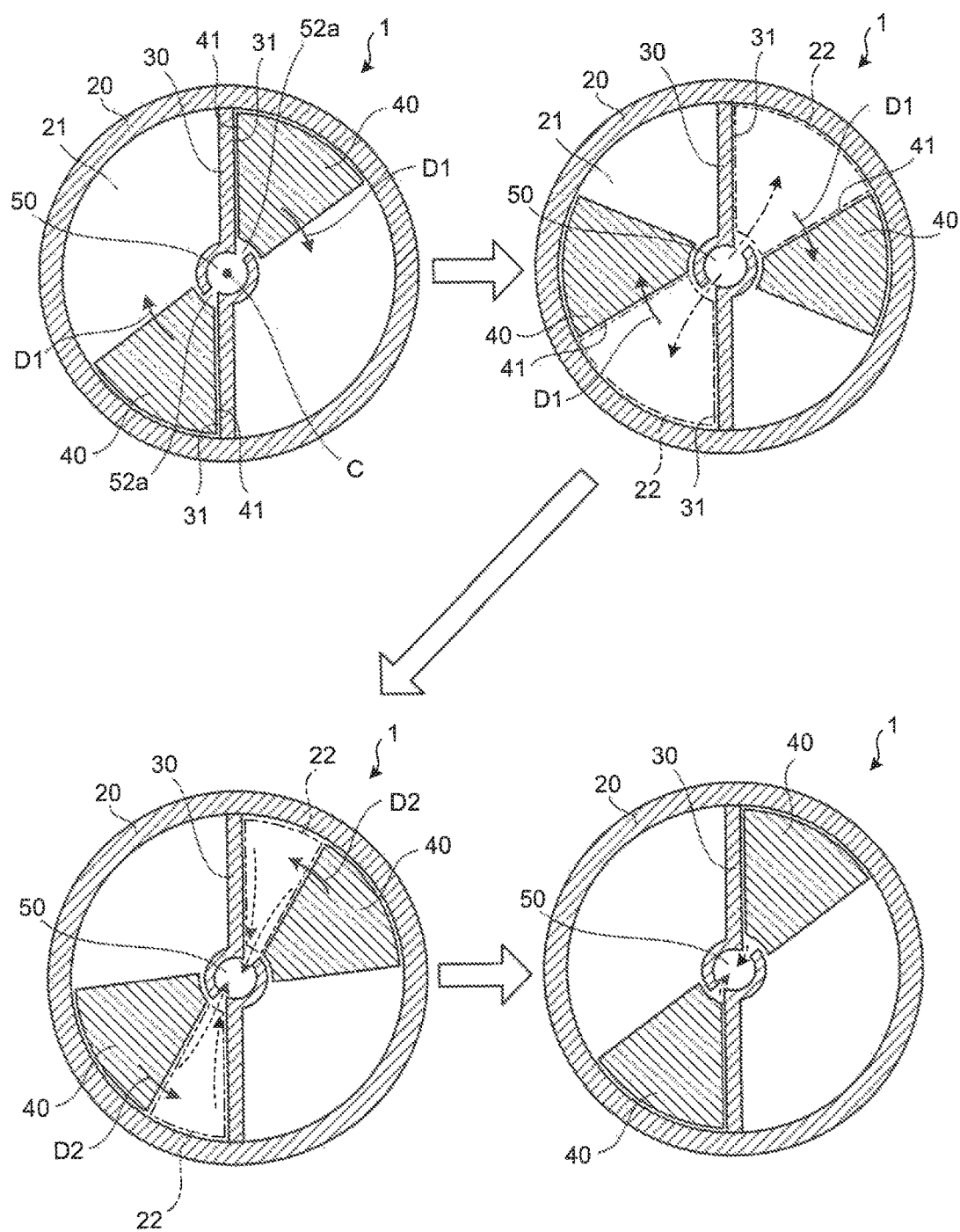
FIG. 1B is a diagram illustrating operations of the extraneous-matter removing apparatus.

As illustrated in the upper-right part of FIG. 1B, the side surfaces 41 of the vanes 40 are moved in directions, which are away from the wall surfaces 31 of the walls 30, caused by the rotation of the vanes 40 so as to expand the rooms 22. Thus, the negative pressure is generated in the rooms 22, and an intake air flows from the flow path 50 as indicated by one-dot-line arrows.

Figure 5:
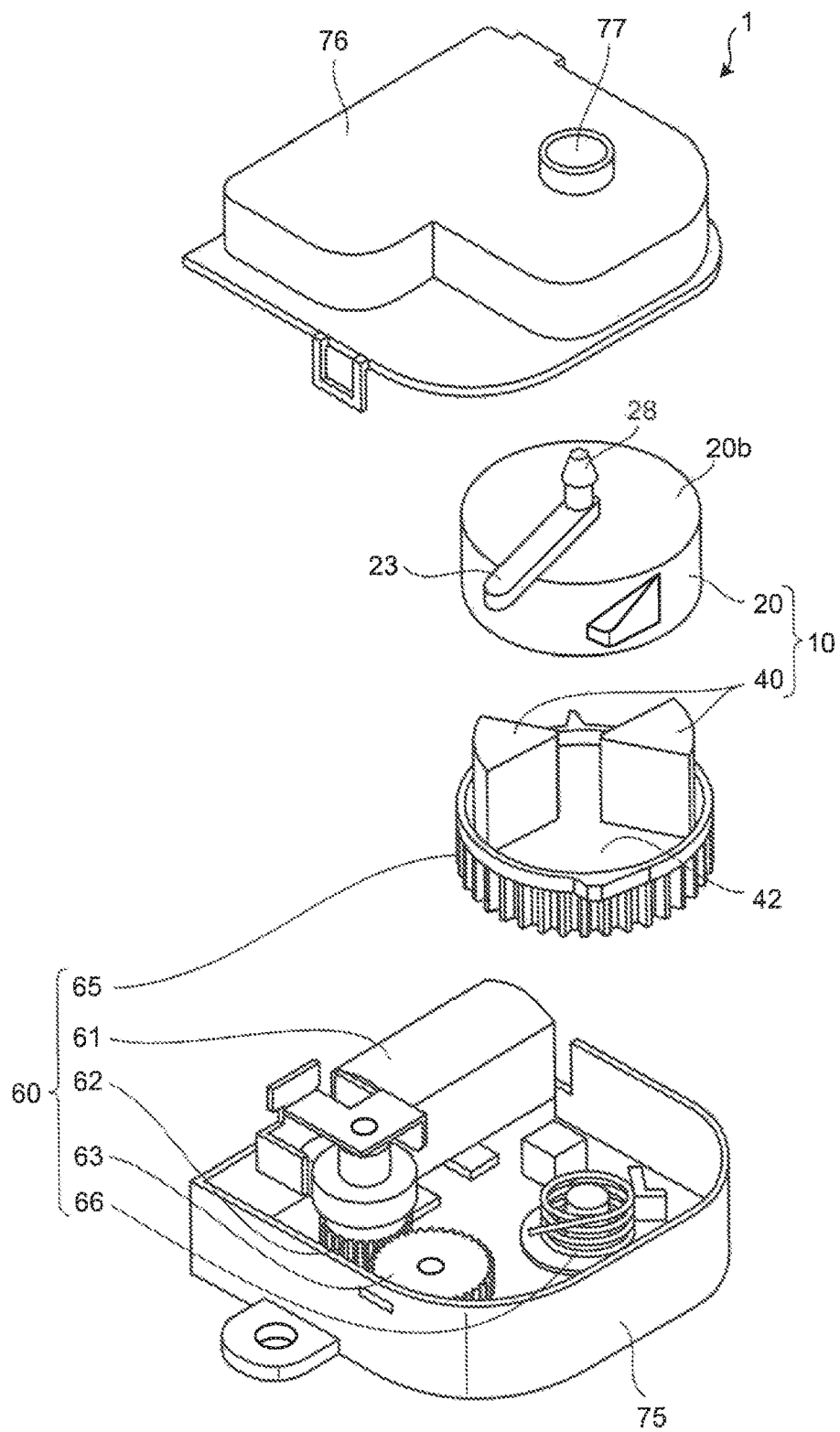
FIG. 5 is an exploded perspective view illustrating the extraneous-matter removing apparatus.

Next, as illustrated in the lower-left part of FIG. 1B, the vanes 40 are rotated in the other direction around the rotation axis C by the drive unit 60 (see FIG. 5). The other direction means a direction reverse to the above one direction. As indicated by arrows D2, the other direction is left-handed (counterclockwise) on the sheet of FIG. 1B, however, not limited thereto. A configuration of the drive unit 60 for rotating the vanes 40 in one direction or the other direction will be mentioned later with reference to FIGS. 5 and 6A etc.

The side surfaces 41 of the vanes 40 are moved in directions approaching the wall surfaces 31 of the walls 30 by the rotation of the vanes 40 in the other direction, and the rooms 22 are compressed, in other words, compressed air is generated.

As indicated by dashed-line arrows, the compressed air flows from the rooms 22 to the flow path 50 through the inlets 52a. As illustrated in the lower-right part of FIG. 1B, the vanes 40 are assumed to be rotated by the drive unit 60 in the other direction so as to return to a position of the initial state where the side surfaces 41 face the wall surfaces 31 of the walls 30.

As illustrated in FIG. 1A, the compressed air flowing in the flow path 50 is ejected to the camera 100 from the outlet 52b. Thus, it is possible to remove an extraneous matter such as a water droplet attached to a lens of the camera 100.

In this manner, the air compressing unit 10 is configured to eject, to the camera 100, the compressed air generated by rotation of the vanes 40, and thus, unlike the piston structure, a part protruding from a profile of a cylinder in a stroke direction can be eliminated, so that it is possible to miniaturize the air compressing unit 10. Thus, it is possible to save the space of the extraneous-matter removing apparatus 1, in other words, it is possible to reduce an occupancy space when the extraneous-matter removing apparatus 1 is provided in a vehicle.

An operation sound during air compression of the rotating vanes 40 is smaller than that of the reciprocating piston, and thus it is possible to reduce the operation sound in the air compressing unit 10 of the extraneous-matter removing apparatus 1.

Moreover, it is possible for the air compressing unit 10 to generate compressed air with a simple configuration of rotating the vanes 40.

The air compressing unit 10 is configured to eject compressed air in a direction of the rotation axis C of the vanes 40, in other words, eject compressed air in a direction perpendicular to a rotation direction of the vanes 40. Thus, the generated compressed air is able to be collected, so that it is possible to eject, to the camera 100, compressed air that is collected to be a relatively high pressure.

The flow path 50 is formed to be along the rotation axis C of the vanes 40 in the cylinder 20. Thus, the generated compressed air is able to be collected to one spot of the flow path 50, so that it is possible to reliably obtain compressed air having a relatively high pressure to be ejected to the camera 100.

Furthermore, a space in near the rotation axis C of the vanes 40, which is inclined to become a dead space in the cylinder 20, is able to be effectively used as a flow path of the compressed air, so that it is possible to miniaturize the air compressing unit 10 as a result.

The flow path 50 includes (i) the inlets 52a that are formed close to the bottom surface 20a of the cylinder 20 and (ii) the outlet 52b that is formed close to the ceiling surface 20b of the cylinder 20. Thus, it is possible to ensure, in the flow path 50, a flow-path length for obtaining compressed air having a relatively high pressure.

Moreover, the plurality of vanes 40 is arranged in a rotationally symmetrical arrangement. Thus, for example, impact forces given by the vanes 40 to the walls 30 when compressed air is generated work in directions for canceling each other. Thus, it is possible to ease effects on the air compressing unit 10 caused by the impact forces.

Hereinafter, a configuration of the extraneous-matter removing apparatus 1 according to the present embodiment illustrated in FIGS. 1A and 1B will be more specifically explained. FIG. 2 is a perspective view illustrating a vehicle 2 in which the extraneous-matter removing apparatus 1 is provided.

Here the target whose extraneous matter is to be removed by the extraneous-matter removing apparatus 1 is the camera (rear camera) 100 for capturing a backward of the vehicle 2, however, not limited thereto.

In other words, for example, an optical sensor for acquiring, through a lens, an image or information on a target object in the vicinity of the vehicle may be sufficient. Specifically, the target may be various optical sensors such as a front camera for capturing a forward of a vehicle, a side camera for capturing a sideward of a vehicle, and a radar apparatus for detecting a target object existing in the vicinity of the vehicle.

Figure 2:
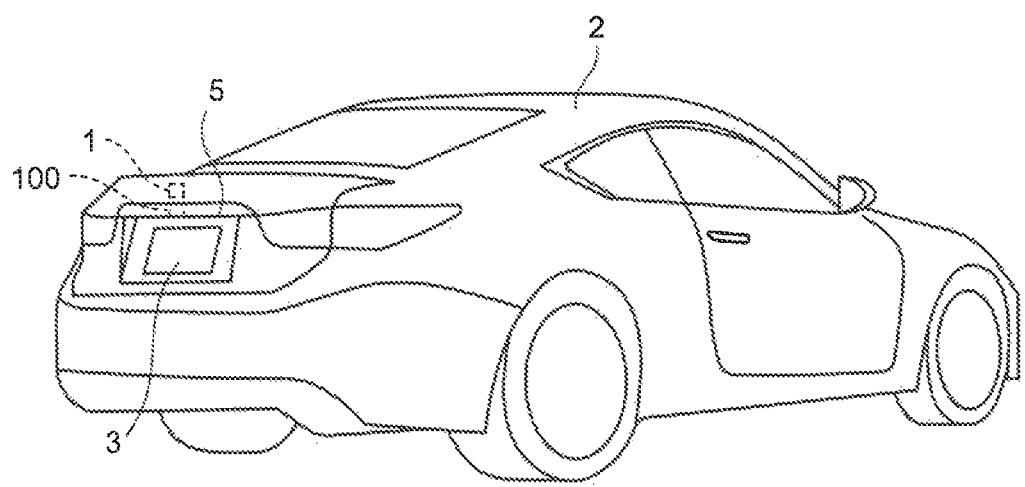
FIG. 2 is a perspective view illustrating a vehicle in which the extraneous-matter removing apparatus is provided.

As illustrated in FIG. 2, the extraneous-matter removing apparatus 1 and the camera 100 are provided at a position that is an upper part of a license plate 3 arranged in a rear part of the vehicle 2 and is substantially a center of the vehicle 2 in the right and left direction, for example.

Figure 3A:
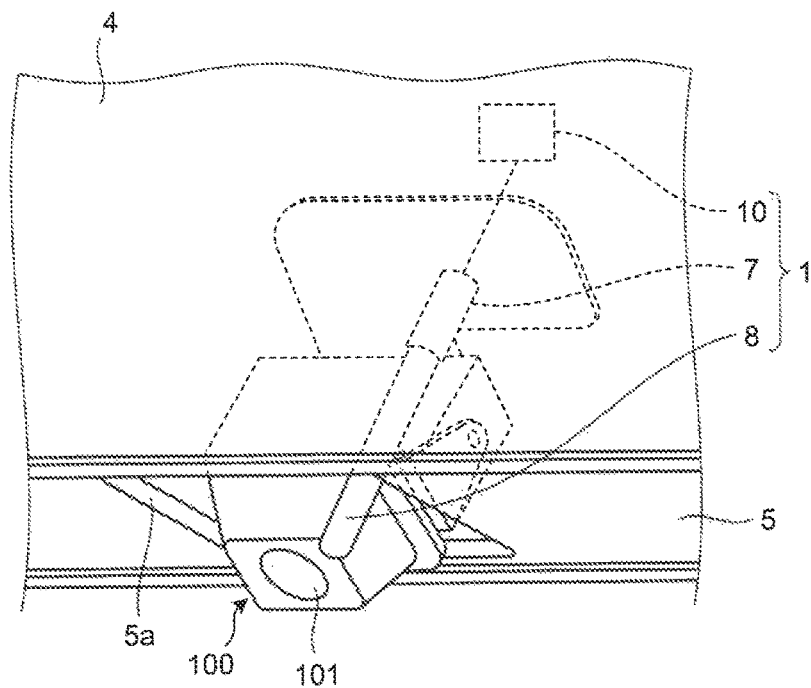
FIG. 3A is an enlarged perspective view illustrating a vicinity of a camera provided in a rear part of the vehicle.
Figure 3B:
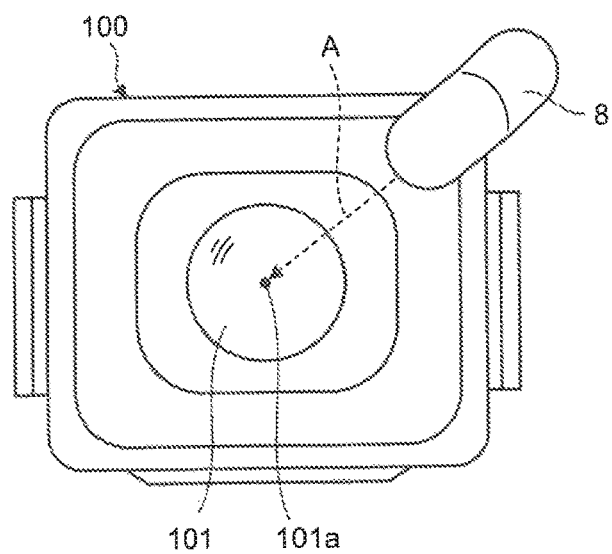
FIG. 3B is a front view illustrating the camera seen from a lens side.

FIG. 3A is an enlarged perspective view illustrating a vicinity of the camera 100 provided in a rear part of the vehicle 2 illustrated in FIG. 2. FIG. 3B is a front view illustrating the camera 100 illustrated in FIG. 3A seen from a lens 101 side.

As illustrated in FIG. 3A, a garnish 5 is attached to a vehicle back panel 4, and the camera 100 is arranged in a space between the vehicle back panel 4 and the garnish 5. The garnish 5 has an opening 5a, and the camera 100 is arranged so that the lens 101 is exposed to the outside from this opening 5a.

The extraneous-matter removing apparatus 1 includes a hose 7 and a nozzle 8 in which compressed air generated by the air compressing unit 10 flows, in addition to the air compressing unit 10. The air compressing unit 10 is assumed to be arranged on the back surface of the vehicle back panel 4. In FIG. 3A, for simplification of illustration, the air compressing unit 10 is indicated by a quadrilateral block.

Compressed air generated by the air compressing unit 10 is ejected toward the lens 101 of the camera 100 from the nozzle 8 through the hose 7 (see dashed-line arrow A illustrated in FIG. 3B).

An arrangement position of the nozzle 8 to the lens 101 of the camera 100 will be explained. As illustrated in FIG. 3B, the nozzle 8 arranged on obliquely upper side of the lens 101 in a front view of the lens 101. Specifically, the nozzle 8 is arranged so that an ejection direction of the compressed air indicated by the dashed-line arrow A is directed to a center point 101a of the lens 101 from the obliquely upper side of the lens 101.

Thus, the nozzle 8 is able to be appropriately arranged for the lens 101. In other words, if the nozzle 8 is arranged on an upper side of the lens 101 in the front view of the lens 101, a water droplet attached to the nozzle 8 etc. drips and is imaged by the camera 100. In a case where the lens 101 is a wide-angle lens, if the nozzle 8 is arranged on a side of the lens 101 in the front view of the lens 101, the nozzle 8 itself is to be imaged by the camera 100. Therefore, in the present embodiment, the nozzle 8 is arranged in the aforementioned position, whereby the nozzle 8 is able to be appropriately arranged while preventing an occurrence of the aforementioned imaging.

Figure 4:
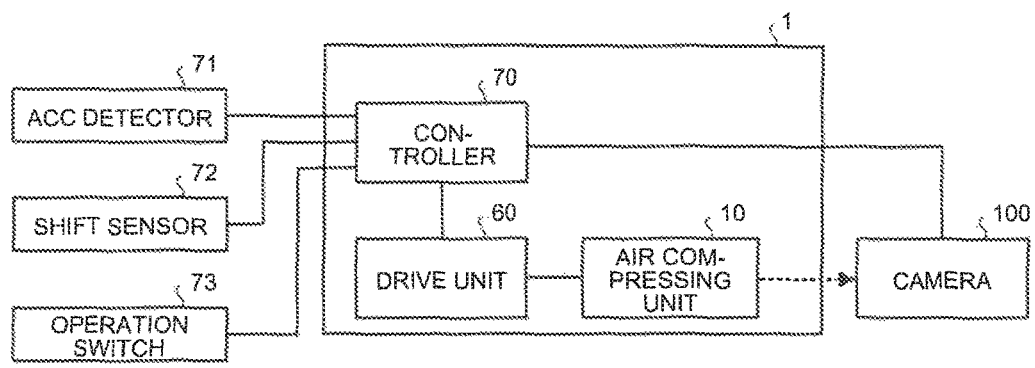
FIG. 4 is a block diagram illustrating configuration examples of the extraneous-matter removing apparatus and the camera.

Next, one example of a timing of the extraneous-matter removing apparatus 1 for ejecting compressed air will be explained with reference to FIG. 4. FIG. 4 is a block diagram illustrating configuration examples of the extraneous-matter removing apparatus 1 and the camera 100.

As illustrated in FIG. 4, the extraneous-matter removing apparatus 1 includes a controller 70 in addition to the above air compressing unit 10 and the above drive unit 60. As described above, the drive unit 60 rotates the vanes 40 (see FIG. 1A etc.) of the air compressing unit 10 to generate compressed air, and ejects the compressed air to the camera 100.

The controller 70 is a microcomputer including a Central Processing Unit (CPU) and a storage (not illustrated), and controls operations of the drive unit 60. The controller 70 is connected with an accessory-power-source detector (ACC detector) 71, a shift sensor 72, an operation switch 73, and the camera 100.

The ACC detector 71 outputs, when an ACC is on, a signal indicating that the ACC is ON to the controller 70. The shift sensor 72 outputs a signal indicating a shifter (not illustrated) position to the controller 70. The shifter position includes "advance position" for advancing the vehicle 2, "retreat position" for retreating the vehicle 2, etc.

The operation switch 73 is arranged in an appropriate position of a vehicle interior (not illustrated), and is operated when a driver desires the extraneous-matter removing apparatus 1 to remove an extraneous matter. When operated by a driver, the operation switch 73 outputs, to the controller 70, a signal indicating that the operation switch 73 is operated. The camera 100 outputs, to the controller 70, a signal indicating a captured image.

In the extraneous-matter removing apparatus 1 configured as described above, when a signal indicating that the ACC is ON is input from the ACC detector 71, for example, the controller 70 operates the drive unit 60 so as to eject compressed air to the camera 100. Thus, it is possible to remove an extraneous matter such as a water droplet attached to the camera 100 when the vehicle is at a stop, for example.

When a signal indicating a retreat position is input from the shift sensor 72, for example, the controller 70 operates the drive unit 60 so as to eject compressed air to the camera 100. Thus, for example, it is possible to improve the sight of the camera 100 in retreating.

When a signal indicating being operated is input from the operation switch 73, for example, the controller 70 operates the drive unit 60 so as to eject compressed air to the camera 100. Thus, it is possible to remove, when a driver himself/herself recognizes an extraneous matter attached to the camera 100, for example, the extraneous matter at a timing desired by the driver.

For example, the controller 70 analyzes a signal indicating an image input from the camera 100, and determines presence or absence of an extraneous matter of the camera 100. When determining that an extraneous matter is attached to the camera 100, the controller 70 operates the drive unit 60 so as to eject compressed air to the camera 100. Thus, it is possible to remove an extraneous matter attached to the camera 100 in the early stage.

In the aforementioned, the controller 70 operates the drive unit 60 on the basis of signals from the ACC detector 71, the shift sensor 72, the operation switch 73, and the camera 100, however, this case is merely an example, and is not limited thereto. In other words, the controller 70 may operate the drive unit 60 on the basis of any of the signals from the ACC detector 71, the shift sensor 72, the operation switch 73, and the camera 100.

A timing for operating the drive unit 60 is not limited to the aforementioned, and may be another timing such as a timing when a windshield wiper is operated and a timing when temperature, degree of humidity, etc. satisfy a condition of a water droplet for adhering to the camera 100.

FIG. 5 is an exploded perspective view illustrating the extraneous-matter removing apparatus 1. As illustrated in FIG. 5, the extraneous-matter removing apparatus 1 includes the above air compressing unit 10, the above drive unit 60, a case 75, and a cover 76.

The case 75 houses the air compressing unit 10, the drive unit 60, etc. The cover 76 is attached to an upper part of the case 75 that houses the air compressing unit 10 etc. so as to prevent dust etc. from penetrating into the case 75.

The cylinder 20 of the air compressing unit 10 includes an intake part 23 and a hose connecting port 28. The intake part 23 is formed on the ceiling surface 20b of the cylinder 20, and is extended to the outside from the center part of the cylinder 20 along a radial direction.

Figure 6A:
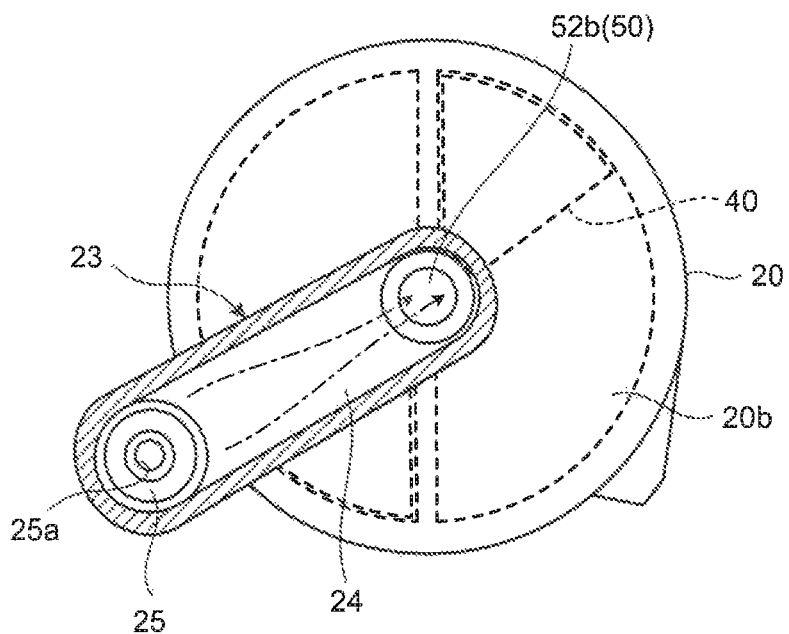
FIG. 6A is a lateral-cross-sectional view illustrating a cylinder whose intake part is cut in a horizontal direction.

FIG. 6A is a lateral-cross-sectional view illustrating the cylinder 20 whose intake part 23 is cut in a horizontal direction. As illustrated in FIG. 6A, the intake part 23 includes an intake flow path 24 and an intake valve 25.

The intake flow path 24 is a long flow path in which an intake air to the air compressing unit 10 flows. Specifically, one end of the intake flow path 24 is positioned at the center of the cylinder 20 to be able to be communicated with the outlet 52b of the aforementioned flow path 50.

Figure 6B:
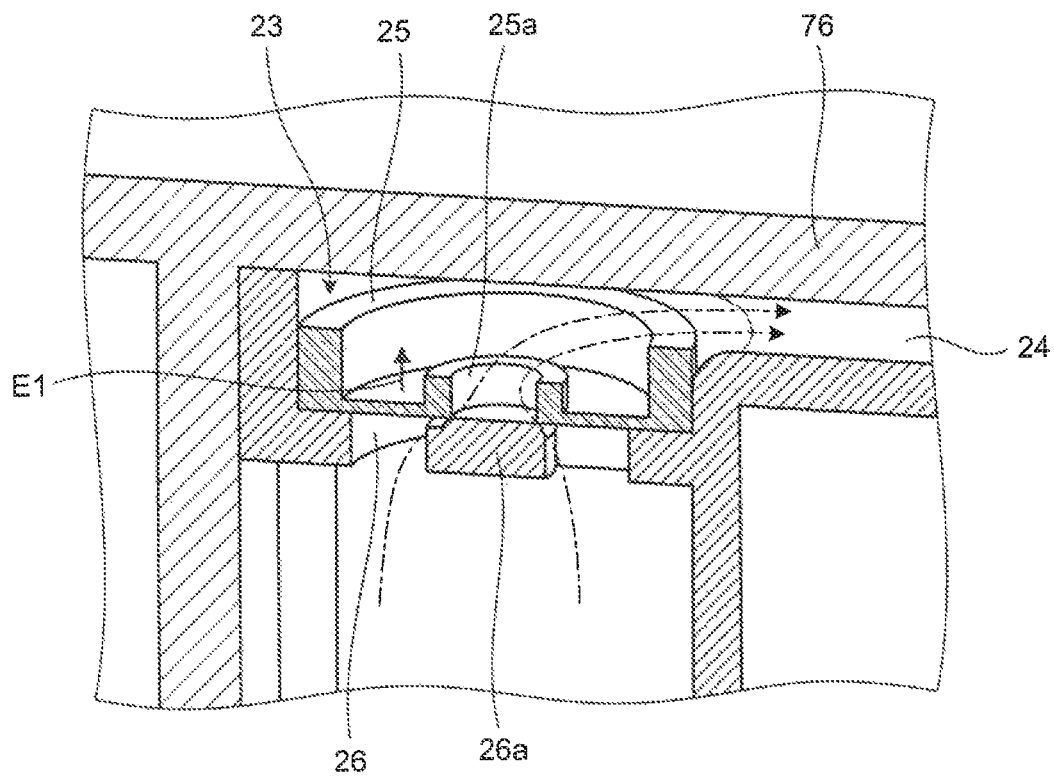
FIG. 6B is an enlarged longitudinal-cross-sectional view illustrating a configuration of an intake valve.

On the other hand, the other end of the intake flow path 24 is positioned at an outer side that an outer periphery of the cylinder 20. The intake valve 25 is attached to the other end side of the intake flow path 24. FIG. 6B is an enlarged longitudinal-cross-sectional view illustrating a configuration of the intake valve 25. In FIG. 6B, a state is illustrated in which the cover 76 is arranged in an upper part of the cylinder 20.

As illustrated in FIG. 6B, the intake valve 25 is a diaphragm valve made of elastic material having the elasticity, such as silicon rubber. Specifically, the intake valve 25 is circularly formed, for example, and a center hole 25a is formed near the center of the intake valve 25.

On the other end side of the intake flow path 24, a round-hole-shaped air intake 26 is opened. The diameter of the air intake 26 is set to be smaller than that of the intake valve 25, and thus the intake valve 25 is placed to be attached to the air intake 26.

A boss 26a is formed near the center of the air intake 26. In a state where the intake valve 25 is attached, the boss 26a has a shape in a top view to close the center hole 25a.

When the above intake valve 25 is provided, only an intake air flows in the intake flow path 24, and compressed air does not flow. In other words, the rooms 22 of the cylinder 20 are expanded when the air compressing unit 10 is taking air (see upper-right part of FIG. 1B), the negative pressure is generated in the intake flow path 24 that is communicated with the flow path 50. As indicated by an arrow E1, the vicinity of the center hole 25a of the intake valve 25 is lifted upward by this negative pressure, and a gap is generated between the vicinity of the center hole 25a and the boss 26a.

Thus, as indicated by one-dot-line arrows in FIG. 6B, an intake air flows into the intake flow path 24 through the center hole 25a of the intake valve 25 from the air intake 26, and then, flows into the rooms 22 through the outlet 52b and the inlets 52a of the flow path 50.

On the other hand, the pressure of the intake flow path 24 is positive when the air compressing unit 10 is compressing (see lower-left part of FIG. 1B), a force having a direction opposite to the arrow E1 works on the intake valve 25. Therefore, the center hole 25a of the intake valve 25 is to be sealed by the boss 26a. Thus, compressed air does not flows into the intake flow path 24 to flow out from the intake valve 25, so that it is possible to suppress reduction in the pressure of the compressed air.

Figure 7:
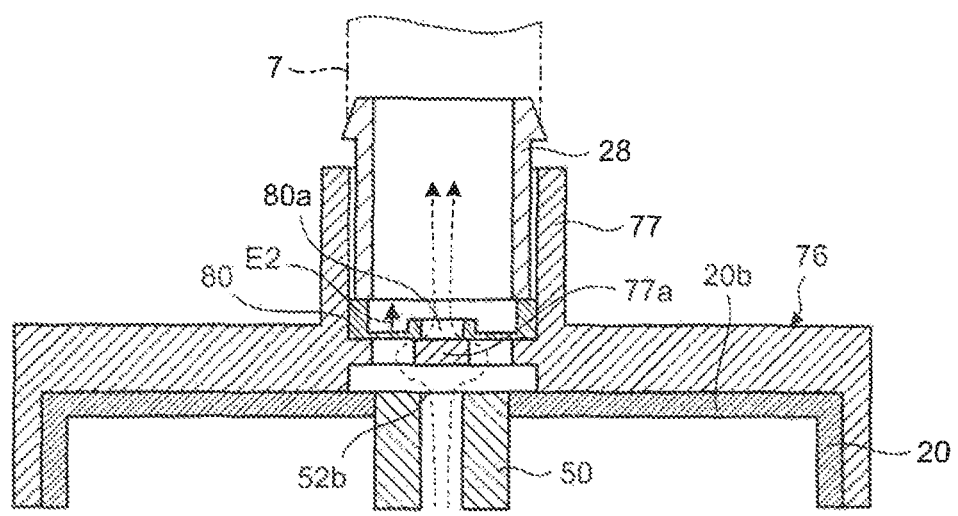
FIG. 7 is an enlarged longitudinal-cross-sectional view illustrating a vicinity of a ceiling surface of the cylinder.

FIG. 7 is an enlarged longitudinal-cross-sectional view illustrating a vicinity of the ceiling surface 20b of the cylinder 20. As indicated by imaginary lines in FIG. 7, the above hose 7 is connected with the hose connecting port 28. An end part of the hose 7 to be connected with the hose connecting port 28 is an end part that is an opposite side to an end part to be connected with the nozzle 8.

The hose connecting port 28 is formed so that the hose 7 communicates with the outlet 52b of the flow path 50. An exhaust valve 80 is arranged between the hose connecting port 28 and the outlet 52b of the flow path 50. The exhaust valve 80 has a configuration similar to that of the above intake valve 25, and thus only compressed air flows into the hose connecting port 28 and the hose 7, and an intake air does not flow.

Specifically, the exhaust valve 80 is a diaphragm valve that is made of elastic material and a center hole 80a is formed near the center of the exhaust valve 80. At a position in the cover 76 corresponding to the outlet 52b, a round-hole-shaped insertion hole 77 is bored, into which the hose connecting port 28 is inserted.

The insertion hole 77 includes a part having, near a lower end thereof, a hole whose diameter is formed to be smaller than the diameter of the exhaust valve 80, and this part is placed on the exhaust valve 80 to be attached thereto. A boss 77a is formed in a part on which the exhaust valve 80 is placed in the insertion hole 77. In a state where the exhaust valve 80 is attached, the boss 77a has a shape in a top view to close the center hole 80a.

Therefore, the pressure of the flow path 50 is positive when the air compressing unit 10 is compressing, as indicated by an arrow E2, the vicinity of the center hole 80a of the exhaust valve 80 is lifted upward, and a gap is generated between the vicinity of the center hole 80a and the boss 77a.

Thus, as indicated by dashed-line arrows in FIG. 7, compressed air is ejected to the camera 100 from the outlet 52b of the flow path 50 through the center hole 80a of the exhaust valve 80, the hose connecting port 28, the hose 7, and the nozzle 8 (see FIG. 3A).

On the other hand, when the air compressing unit 10 is taking air (see upper-right part of FIG. 1B), the pressure of the flow path 50 is negative, a force having a direction opposite to the arrow E2 works on the exhaust valve 80. Thus, the center hole 80a of the exhaust valve 80 is sealed by the boss 77a.

Therefore, an intake air does not flow back to the flow path 50 from the nozzle 8 through the hose 7 and the hose connecting port 28. Thus, it is possible to prevent an extraneous matter such as a water droplet and dust adhere to the nozzle 8 from penetrating into the flow path 50 etc. along with an intake air.

When there exists a plurality of outlets for compressed air, a plurality of the exhaust valves 80 may be provided, in the present embodiment, the flow path 50 is formed along the rotation axis C of the vanes 40 and the outlet 52b is one spot, and thus the exhaust valves 80 is able to be collected into one.

Returning to the explanation of FIG. 5, the plurality of vanes 40 (herein, "two") is provided on a disk-shaped base 42. Therefore, when the base 42 is rotated around the rotation axis C (see FIG. 1A), the two vanes 40 are similarly rotated.

The drive unit 60 includes an electric motor 61, gears 62, 63, an chipped-tooth gear 64 (see FIG. 8A), a vane gear 65, and a torsion spring 66. FIGS. 8A to 8D are diagrams illustrating a configuration and operations of this drive unit 60.

FIGS. 8A to 8D are top views illustrating the drive unit 60 and the air compressing unit 10, and parts of them are indicated by using cross-sectional views for convenience of understanding. States of the air compressing unit 10 illustrated in FIGS. 8A, 8B, 8C, 8D respectively correspond to the upper-left part, the upper-right part, the lower-left part, and the lower-right part illustrated in FIG. 1B in this order.

Figure 8A:
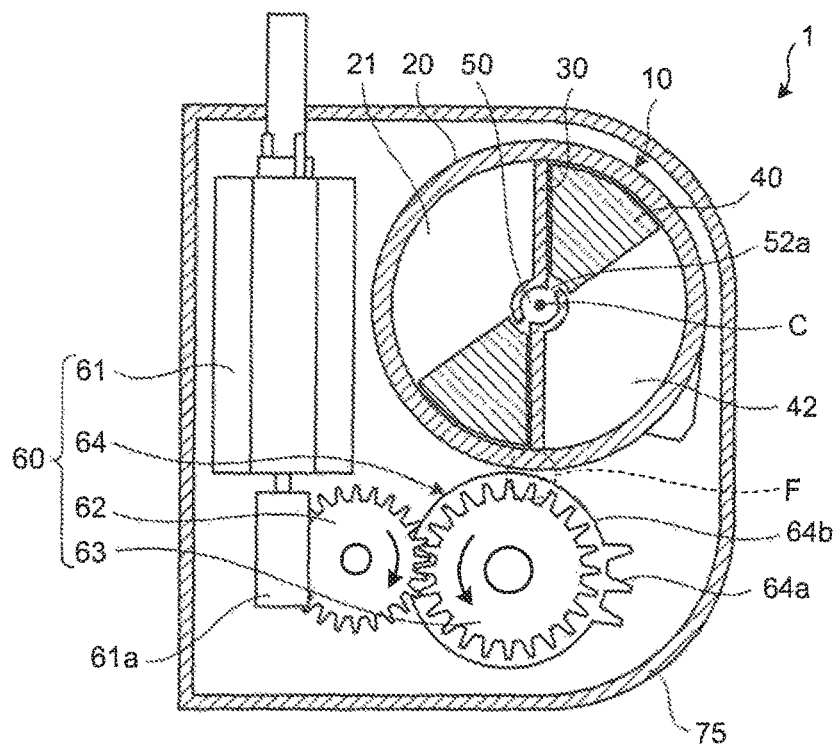
FIG. 8A is diagram illustrating a configuration and one of operations of a drive unit.

As illustrated in FIG. 8A, the electric motor 61 is one example of a drive source for driving the vanes 40 of the air compressing unit 10. In the aforementioned, the electric motor 61 is exemplified as an example of the drive source, however not limited thereto, the drive source may have another type such as a hydraulic motor.

The electric motor 61 includes an output shaft 61a. For example, a worm gear (not illustrated) is formed on the output shaft 61a so as to engage with the gear 62. The gear 62 is also engaged with the gear 63 so as to transmit a driving force from the electric motor 61 to the gear 63.

The gear 63 is arranged coaxially with the chipped-tooth gear 64, and is further configured so as to be integrated with the chipped-tooth gear 64. Therefore, when the gear 63 is rotated by a driving force from the electric motor 61, the chipped-tooth gear 64 is rotated in the same direction (in example illustrated in FIG. 8A, "counterclockwise") in accordance therewith.

The chipped-tooth gear 64 includes an engaging part 64a and a toothless part 64b. The engaging part 64a is a part in which teeth are formed to be able to engage with the vane gear 65 on an outer periphery of the chipped-tooth gear 64. The toothless part 64b is a part in which no tooth is formed not to engage with the vane gear 65 on the outer periphery of the chipped-tooth gear 64.

The chipped-tooth gear 64 is one example of a first chipped-tooth gear. As described above, the chipped-tooth gear 64 is connected with the electric motor 61 through the gear 63 and the gear 62 so as to transmit a driving force of the electric motor 61.

The vane gear 65 (see FIG. 5: in FIG. 8A, hidden behind the base 42) is connected with the vane 40. Specifically, as illustrated in FIG. 5, in the base 42, the vane gear 65 is formed on a surface that is on a side opposite to that on which the vanes 40 are provided, in other words, a lower surface. In FIGS. 8A to 8D, for convenience of understanding, a position where the vane gear 65 and the engaging part 64a of the chipped-tooth gear 64 are engaged with each other is indicated by a dashed-line closed curve F.

When engaging with the engaging part 64a of the chipped-tooth gear 64 in a position of the closed curve F to transmit a driving force from the electric motor 61, the vane gear 65 rotates the vanes 40 in one direction (in FIG. 8A, "clockwise"), this point will be mentioned later. The vane gear 65 is one example of a rotating-body gear.

The torsion spring 66 can be elastically deformed in circumferential directions, for example, and is configured so that one end is directly connected with the case 75, and the other end is connected with the vanes 40. The torsion spring 66 biases the vanes 40 so as to rotate the vanes 40 in the other direction (in FIG. 8A, "counterclockwise").

The torsion spring 66 is one example of an biasing part, however, is not limited thereto. In other words, as the biasing part, it is sufficient that the part can be elastically deformed in the circumferential directions, and a part having another type may be employed, such as a leaf spring and a power spring.

Next, operations of the drive unit 60 will be explained. First, when the vanes 40 are in an initial state before rotating, as illustrated in FIG. 8A, the toothless part 64b of the chipped-tooth gear 64 is assumed to be positioned so as to oppose to the vane gear 65 in a position of the closed curve F. In other words, the vane gear 65 is in a state where a driving force of the electric motor 61 is not transmitted.

Figure 8B:
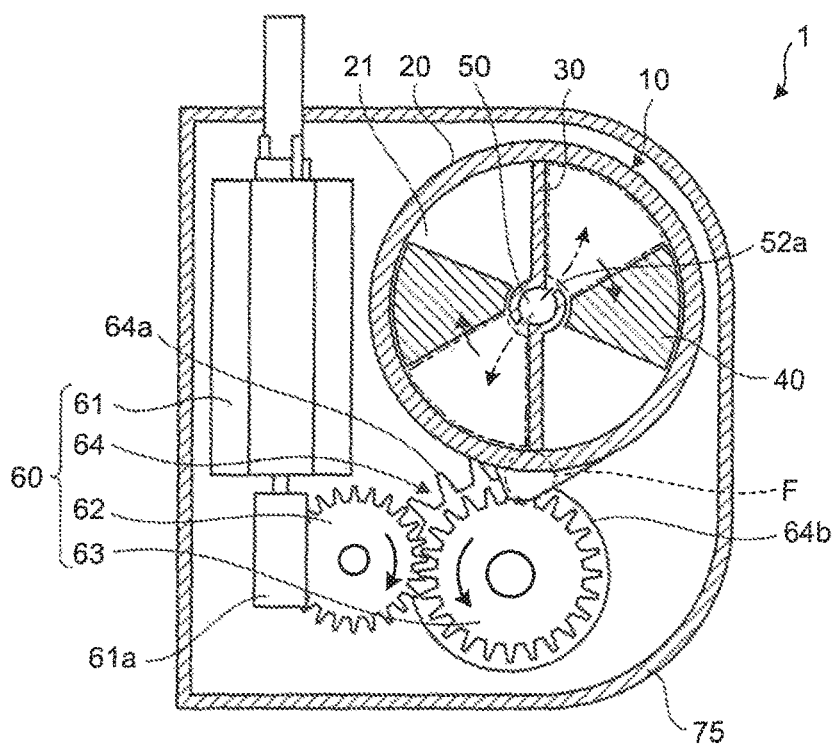
FIG. 8B is diagram illustrating the configuration and one of the operations of the drive unit.

Next, as illustrated in FIG. 8B, the chipped-tooth gear 64 is rotated by a driving force of the electric motor 61, and the engaging part 64a and the vane gear 65 are engaged with each other in a position of the closed curve F. In this case, a driving force of the electric motor 61 is transmitted to the vane gear 65 and the vanes 40, and thus the vane gear 65 and the vanes 40 are rotated in one direction against a biasing force of the torsion spring 66. Thus, the rooms 22 between the vanes 40 and the walls 30 are expanded so as to take air.

Figure 8C:
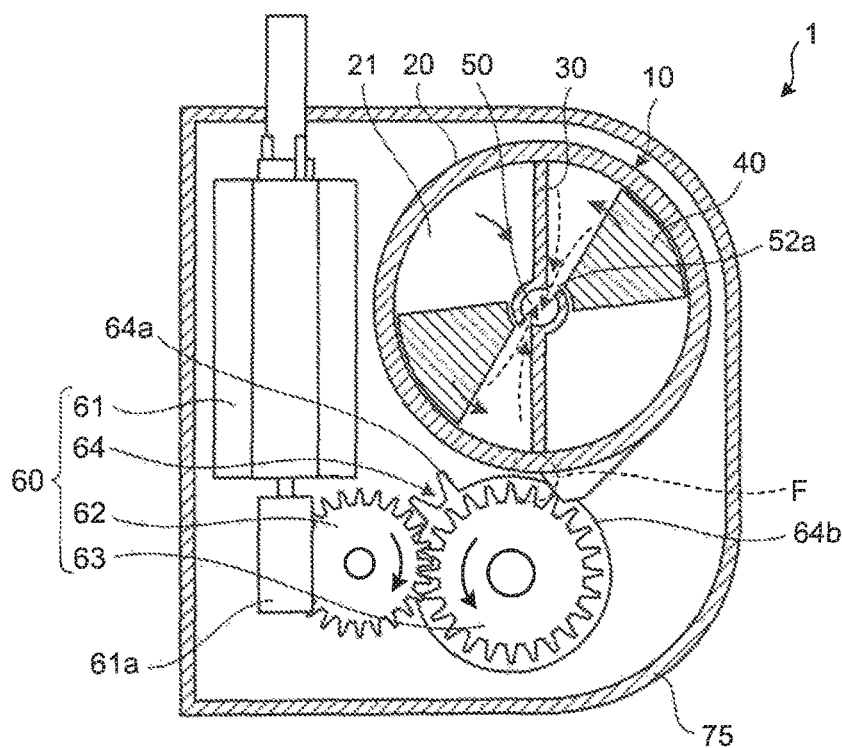
FIG. 8C is diagram illustrating the configuration and one of the operations of the drive unit.
Figure 8D:
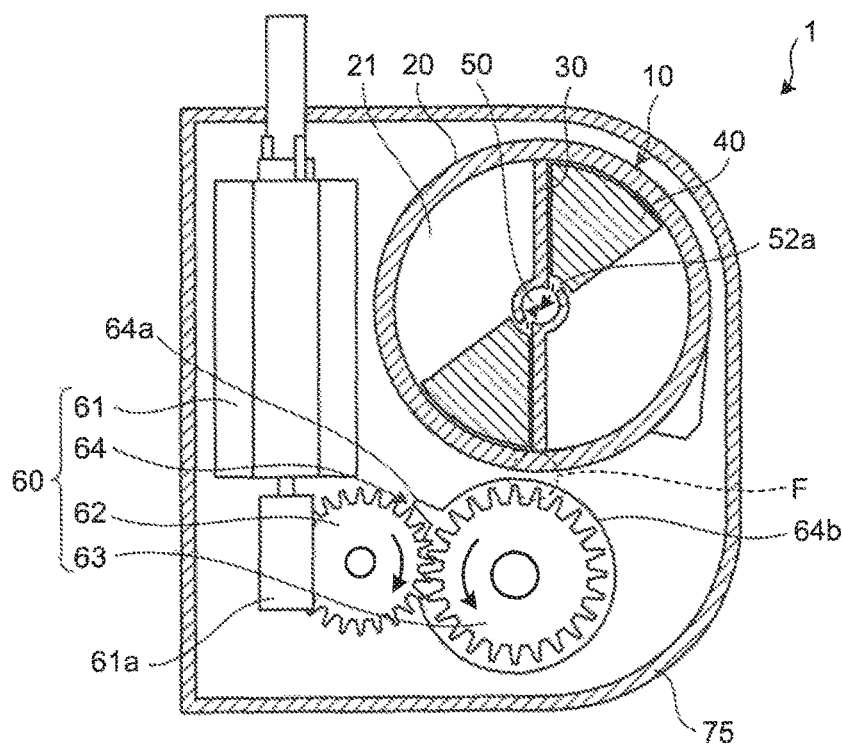
FIG. 8D is diagram illustrating the configuration and one of the operations of the drive unit.

Next, as illustrated in FIGS. 8C and 8D, the chipped-tooth gear 64 is further rotated by a driving force of the electric motor 61, and the toothless part 64b is positioned so as to oppose to the vane gear 65 in a position of the closed curve F. In other words, the vane gear 65 is turned into a state where a driving force of the electric motor 61 is not transmitted. Thus, the vane gear 65 and the vanes 40 are rotated in the other direction by a biasing force of the torsion spring 66, whereby the expanded rooms 22 are compressed to generate compressed air.

In this manner, in the drive unit 60, the chipped-tooth gear 64 is provided on a transmission path for transmitting a driving force of the electric motor 61 to the vanes 40. Thus, in the drive unit 60 of the extraneous-matter removing apparatus 1, by employing a simple configuration using the electric motor 61 whose rotation direction is set to be the same direction, for example, the vanes 40 can be driven so that the rotation direction of the vanes 40 is inverted from one direction to the other direction.

As described above, in the first embodiment, the extraneous-matter removing apparatus 1 that removes an extraneous matter attached to the camera 100 includes the air compressing unit 10. The air compressing unit 10 includes the cylinder 20 and the vanes 40 that are arranged in the cylinder 20 to be rotatable around the rotation axis C, and ejects, to the camera 100, compressed air generated by rotation of the vanes 40. Thus, a size of the air compressing unit 10 is miniaturized, so that it is possible to save space of the extraneous-matter removing apparatus 1.

Second Embodiment

Next, the extraneous-matter removing apparatus 1 according to a second embodiment will be explained. In the first embodiment, the flow path 50, in which compressed air flows, is formed along the rotation axis C of the vanes 40, in the second embodiment, a configuration is employed so that compressed air is collected near the ceiling surface 20b from an outer peripheral side of the cylinder 20 so as to eject the collected compressed air to the camera 100 from the vicinity of the ceiling surface 20b.

Figure 9:
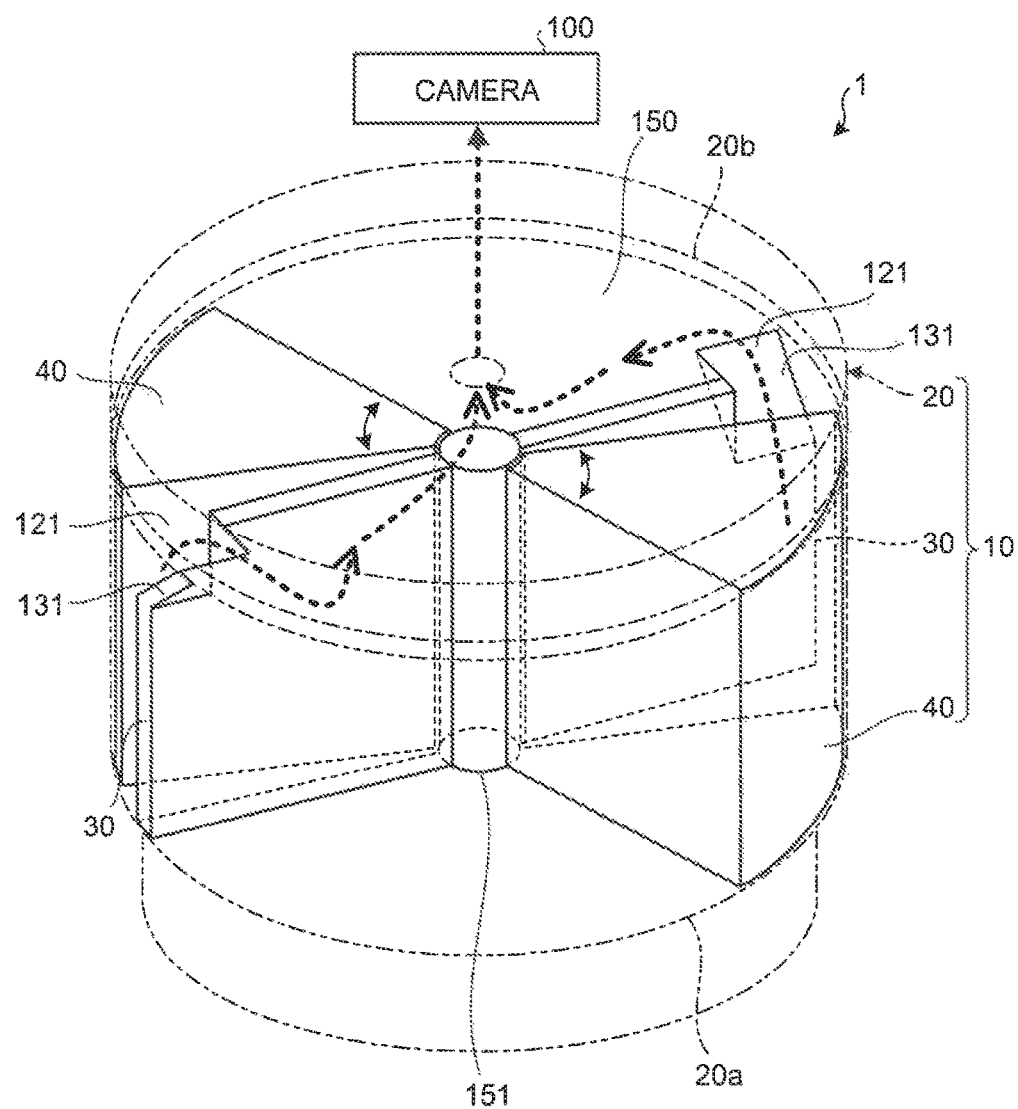
FIG. 9 is a partially-see-through perspective view illustrating a configuration of an extraneous-matter removing apparatus according to a second embodiment.
Figure 10:
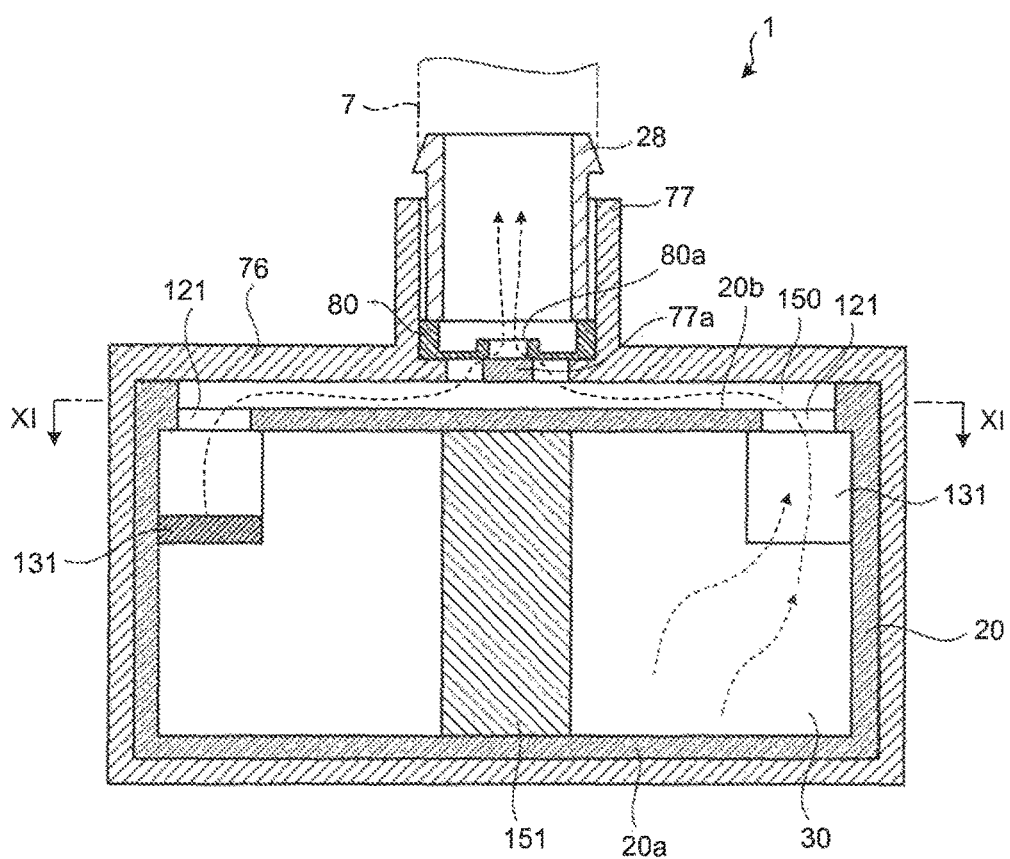
FIG. 10 is a longitudinal-cross-sectional view illustrating the extraneous-matter removing apparatus illustrated in FIG. 9.

FIG. 9 is a partially-see-through perspective view illustrating a configuration of the extraneous-matter removing apparatus 1 according to the second embodiment. FIG. 10 is a longitudinal-cross-sectional view illustrating the extraneous-matter removing apparatus 1 illustrated in FIG. 9. Note that in the following, the parts that are common with those of the first embodiment are represented with same symbols and the description is omitted appropriately.

As illustrated in FIGS. 9 and 10, the cylinder 20 of the air compressing unit 10 according to the second embodiment includes a flow path 150 and communication openings 121. Near the rotation axis C of the vanes 40, where the flow path 50 is formed in the first embodiment, a solidly configured column 151 is provided instead of the flow path 50.

Figure 11:
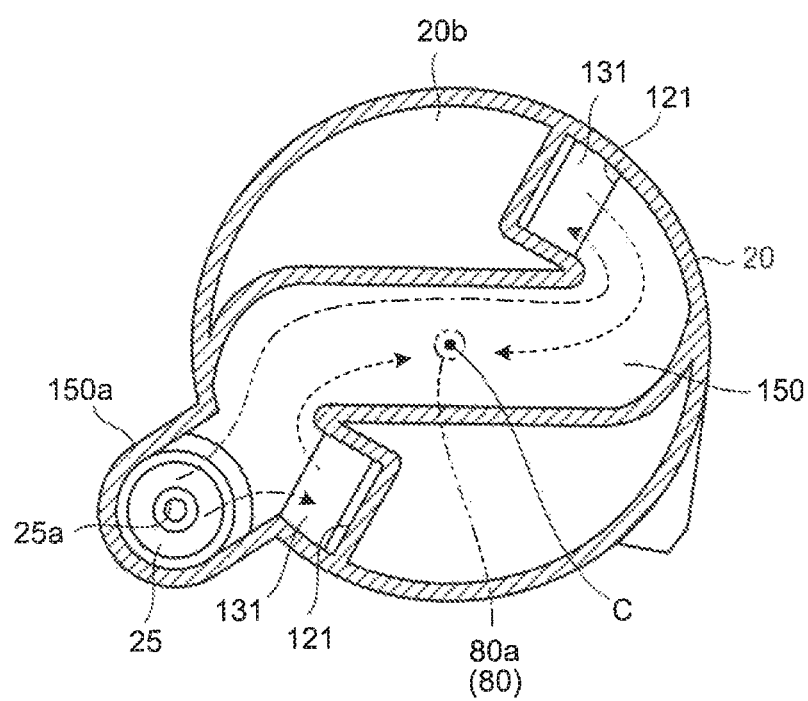
FIG. 11 is a cross-sectional view taken along a line XI-XI in FIG. 10.

FIG. 11 is a cross-sectional view taken along a line XI-XI in FIG. 10. As illustrated in FIGS. 10 and 11, the flow path 150 is formed in the ceiling surface 20b of the cylinder 20, and is configured so that an intake air flows as is to be mentioned later.

When seen from a direction along the rotation axis C, the flow path 150 is formed into a shape so that the flow path 150 is rotational symmetry (in example illustrated in FIG. 11, "point symmetry") around the rotation axis C. The flow path 150 is one example of a second flow path.

As illustrated in FIG. 11, in the flow path 150, a protruding part 150a is formed that partially protrudes to an outer side from an outer periphery of the cylinder 20. The intake valve 25 is placed on this protruding part 150a so as to be attached. Therefore, when the air compressing unit 10 is taking air, an intake air flows into the flow path 150 from the intake valve 25 of the protruding part 150a.

As illustrated in FIG. 9, the wall 30 includes inclined parts 131. The inclined parts 131 are formed in positions on outer peripheral sides of the cylinder 20 and close to the ceiling surface 20b. The inclined parts 131 are inclined upward in a direction away from the side surfaces 41 of the vanes 40, for example.

The communication openings 121 are arranged near the walls 30 in the ceiling surface 20b of the cylinder 20, specifically, in the vicinity of the inclined parts 131 formed in the walls 30 on an outer peripheral side of the cylinder 20, whereby the cylinder chamber 21 and the flow path 150 are communicated with each other.

In the second embodiment, by employing the above configuration, for example, as indicated by one-dot-line arrows in FIG. 11, when the air compressing unit 10 is taking air, an intake air flows into the flow path 150 from the center hole 25a of the intake valve 25. Next, the intake air flows into the rooms 22 (see lower-left part of FIG. 1B) through the communication openings 121.

On the other hand, when the air compressing unit 10 is compressing air, compressed air flows into the flow path 150 from the rooms 22 of the cylinder 20 through the inclined parts 131 and the communication openings 121. Next, the compressed air is ejected to the camera 100 from the flow path 150 through the center hole 80a of the exhaust valve 80, the hose connecting port 28, the hose 7, and the nozzle 8 (see FIG. 3A).

In this manner, in the second embodiment, compressed air is collected into the flow path 150 near the ceiling surface 20b from an outer peripheral side of the cylinder 20, and is ejected to the camera 100 from the flow path 150. Thus, similarly to the first embodiment, unlike the piston structure, a part protruding from a profile of a cylinder in a stroke direction can be eliminated to miniaturize the air compressing unit 10, so that it is possible to save space of the extraneous-matter removing apparatus 1. The remaining effects are similar to those of the first embodiment.

Third Embodiment

Next, the extraneous-matter removing apparatus 1 according to a third embodiment will be explained. The extraneous-matter removing apparatus 1 according to the third embodiment has a configuration for ejecting a wash fluid to the camera 100 in addition to compressed air.

Figure 12:
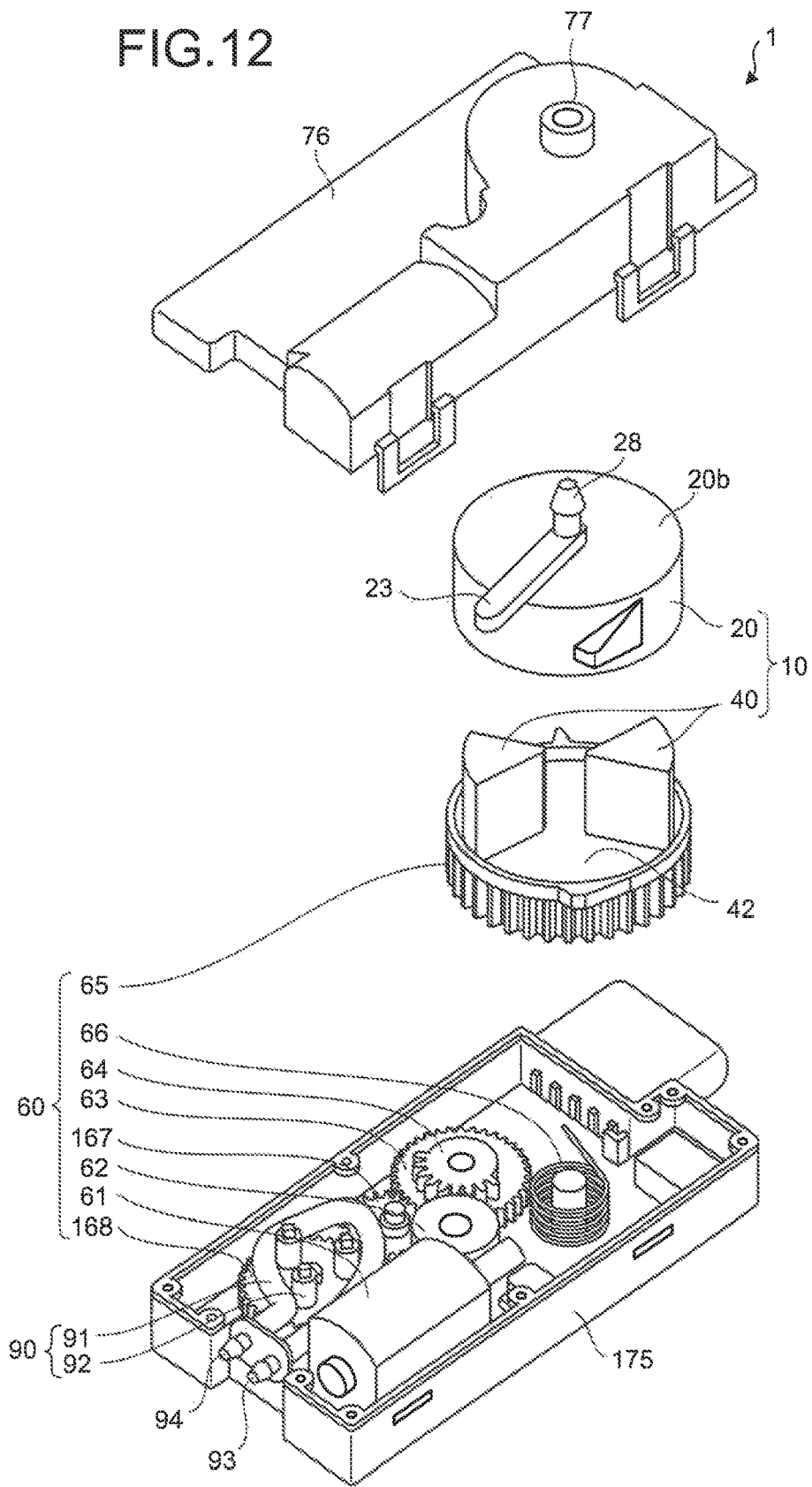
FIG. 12 is an exploded perspective view illustrating an extraneous-matter removing apparatus according to a third embodiment.

Hereinafter, a configuration of the extraneous-matter removing apparatus 1 according to the third embodiment will be explained with reference to FIG. 12. FIG. 12 is an exploded perspective view illustrating the extraneous-matter removing apparatus 1 according to the third embodiment.

As illustrated in FIG. 12, the extraneous-matter removing apparatus 1 according to the third embodiment includes a wash-fluid ejector 90 in addition to the air compressing unit 10. As the wash-fluid ejector 90, for example, a roller pump can be used, not limited thereto.

Specifically, the wash-fluid ejector 90 includes a wash-fluid tube 91 and rollers 92. One end of the wash-fluid tube 91 is connected with a tank 95 (see FIG. 13A) pooling wash fluid through a connection port 93, on the other hand, the other end of the wash-fluid tube 91 is connected with the nozzle 8 (see FIGS. 3A and 13A) through a connection port 94. The wash-fluid tube 91 is assumed to be filled with wash fluid from the tank 95.

The wash-fluid tube 91 is arranged so that the wash-fluid tube 91 is wound around the rollers 92. The rollers 92 are connected with an ejector gear 168 to be mentioned later, and squeeze the wash-fluid tube 91 when they are rotated by the ejector gear 168.

The wash-fluid ejector 90 pressure-feeds wash fluid to the nozzle 8 by using the pressure when the wash-fluid tube 91 squeezed by the rollers 92 goes back so as to eject the wash fluid to the camera 100. The nozzle 8 for ejecting wash fluid may be common with the nozzle 8 for ejecting compressed air, or may be one separate from each other.

The drive unit 60 according to the third embodiment includes a planetary gear 167 and the ejector gear 168 in addition to the aforementioned the electric motor 61, the gears 62, 63, the chipped-tooth gear 64, the vane gear 65, and the torsion spring 66.

Figure 13A:
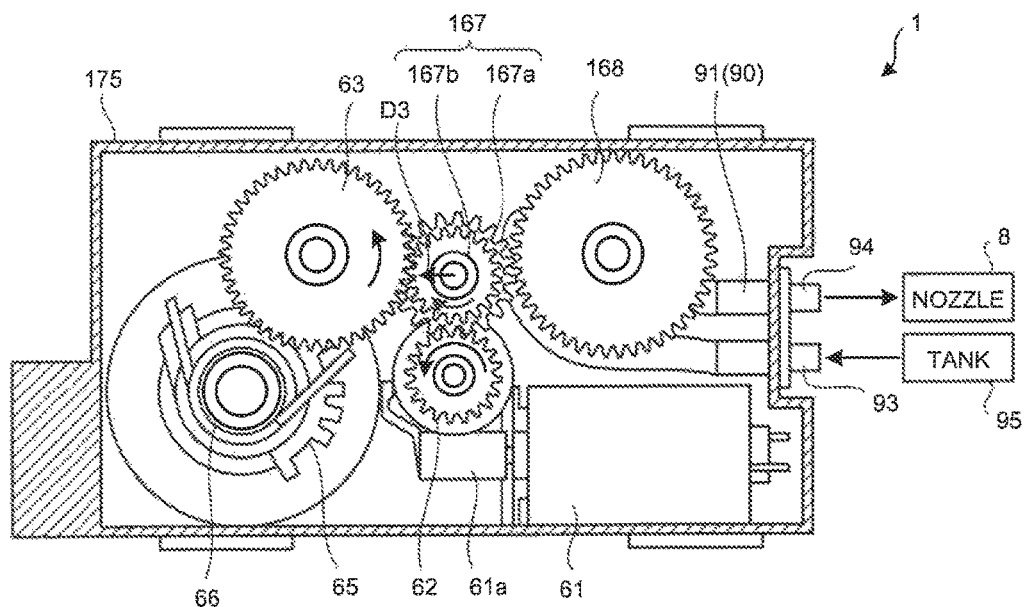
FIG. 13A is a bottom view illustrating a drive unit housed in a case seen from a lower side.
Figure 13B:
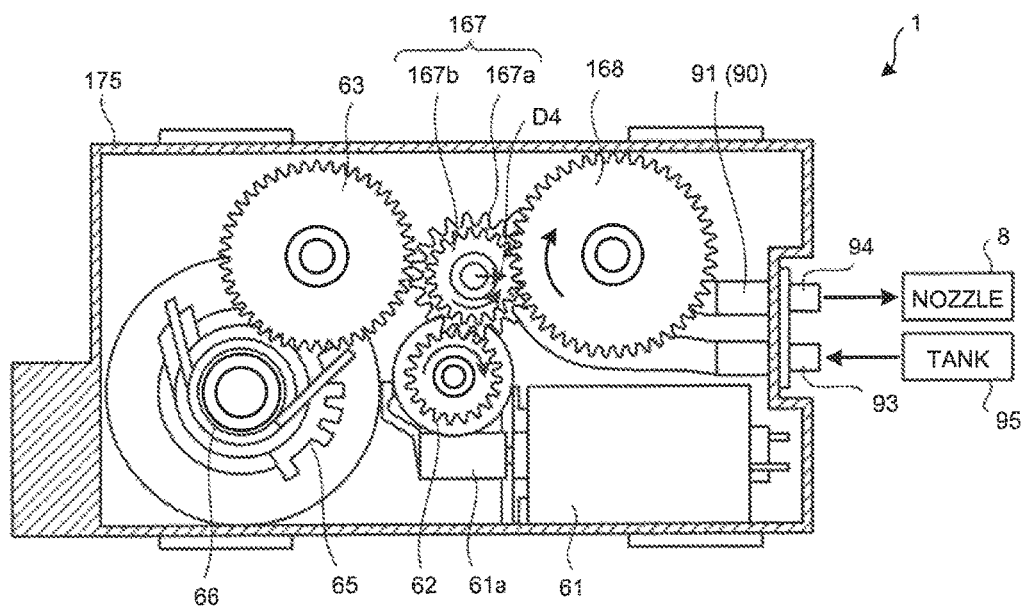
FIG. 13B is a bottom view illustrating the drive unit housed in the case seen from the lower side.

Next, a configuration of the planetary gear 167 and the ejector gear 168 of the drive unit 60 and operations of the drive unit 60 will be explained with reference to FIGS. 13A and 13B. FIGS. 13A and 13B are bottom views illustrating the drive unit 60 housed in a case 175 seen from a lower side. In FIGS. 13A and 13B, for convenience of understanding, a state is illustrated where a lower bottom of the case 175 is removed.

The ejector gear 168 is connected with the aforementioned rollers 92 (hidden behind in FIG. 13A). The ejector gear 168 is rotationally driven when a driving force of the electric motor 61 is transmitted, so as to rotate the rollers 92, in other words, drive the wash-fluid ejector 90.

The planetary gear 167 includes a first gear 167a and a second gear 167b, and is arranged in an area surrounded by the gear 62, the gear 63, and the ejector gear 168, for example.

In this area, the planetary gear 167 is configured so that the planetary gear 167 can move between a position (see FIG. 13A) where the second gear 167b and the gear 63 are engaged with each other and a position (see FIG. 13B) where the second gear 167b and the ejector gear 168 are engaged with each other.

By this movement, the planetary gear 167 switches between a rotating-body transmission path for transmitting a driving force from the electric motor 61 to the vanes 40 and a wash-fluid-ejector transmission path for transmitting a driving force from the electric motor 61 to the wash-fluid ejector 90.

Hereinafter, switching of a transmission path of a driving force caused by the planetary gear 167 will be explained in detail. The first gear 167a is engaged with the gear 62 to which a driving force of the electric motor 61 is transmitted. The first gear 167a is arranged coaxially with the second gear 167b as well as is configured so as to be integrated with the second gear 167b.

The electric motor 61 is set to be able to invert a rotation direction from a normal rotation to a reverse rotation, and from the reverse rotation to the normal rotation. Hereinafter, as illustrated in FIG. 13A, a rotation direction of the electric motor 61 for rotating the gear 62 counterclockwise on the sheet may be referred to as "normal rotation direction", and as illustrated in FIG. 13B, a rotation direction for rotating the gear 62 clockwise may be referred to as "reverse rotation direction".

As illustrated in FIG. 13A, when the electric motor 61 rotates in the normal rotation direction, the gear 62 is rotated counterclockwise. The first gear 167a, which is engaged with the gear 62, of the planetary gear 167 is rotated clockwise by a driving force transmitted from the gear 62. In this case, a force for moving the first gear 167a in a direction toward the gear 63a (see arrow D3) also works.

Thus, the planetary gear 167 is moved to a position where the second gear 167b is engaged with the gear 63 so as to transmit a driving force of the electric motor 61 to the gear 63. The gear 63 to which the driving force is transmitted drives the air compressing unit 10 through the chipped-tooth gear 64 and the vane gear 65 so as to eject compressed air to the camera 100.

On the other hand, as illustrated in FIG. 13B, when the electric motor 61 rotates in the reverse rotation direction, the gear 62 is rotated clockwise. The first gear 167a of the planetary gear 167 engaged with the gear 62 is rotated counterclockwise by a driving force transmitted from the gear 62. In this case, a force for moving the first gear 167a in a direction toward the ejector gear 168 (see arrow D4) also works.

Thus, the planetary gear 167 is moved to a position where the second gear 167b is engaged with the ejector gear 168 so as to transmit a driving force of the electric motor 61 to the ejector gear 168. The ejector gear 168 to which the driving force is transmitted rotationally drives the rollers 92 so as to eject wash fluid to the camera 100.

In this manner, in the third embodiment, the wash-fluid ejector 90 is further included, so that it is possible to efficiently remove an extraneous matter of the camera 100 by using wash fluid.

In the third embodiment, the drive unit 60 is configured to drive both the vanes 40 of the air compressing unit 10 and the wash-fluid ejector 90. Thus, in the drive unit 60, the number of the electric motors 61 as drive sources can be "one", so that it is possible to more save space of the extraneous-matter removing apparatus 1 compared with a configuration in which drive sources for the vanes 40 and the wash-fluid ejector 90 are included.

In the third embodiment, the drive unit 60 is configured to include the planetary gear 167 that is configured as described above. Thus, in the extraneous-matter removing apparatus 1, an operation for ejecting compressed air and an operation for ejecting wash fluid to the camera 100 can be switched by using a simple configuration for switching rotation of the electric motor 61 between the normal rotation direction and the reverse rotation direction, for example. The remaining effects are similar to those of the above embodiments.

Fourth Embodiment

Next, the extraneous-matter removing apparatus 1 according to a fourth embodiment will be explained. In the fourth embodiment, switching between an operation for ejecting compressed air and an operation for ejecting a wash fluid is performed by devising gears used in the drive unit 60.

Figure 14A:
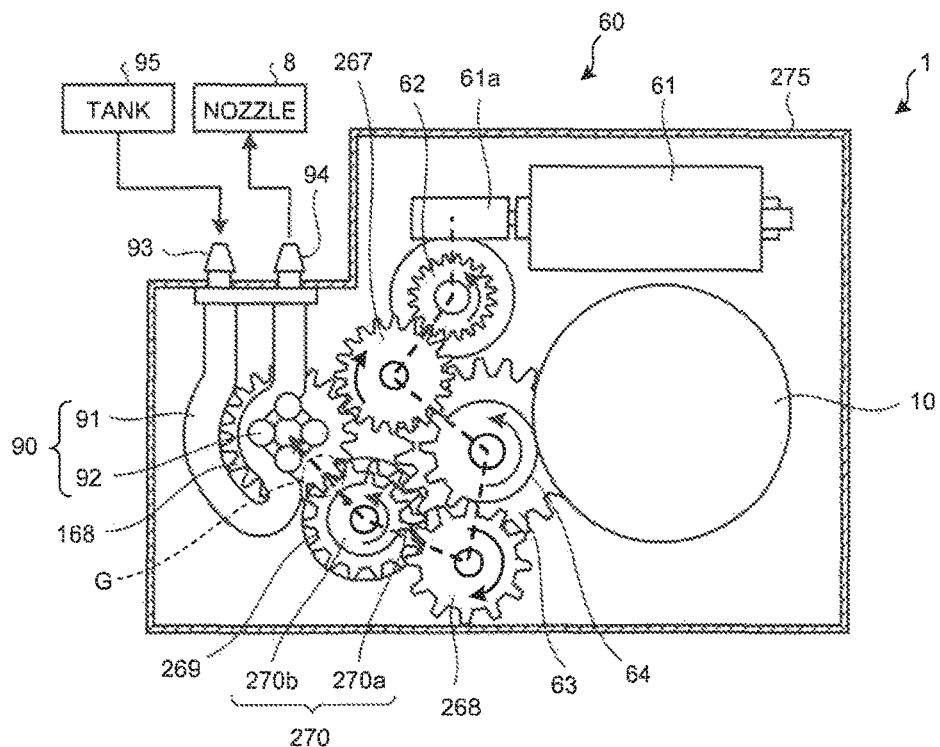
FIG. 14A is a top view illustrating a drive unit housed in a case seen from an upper side.
Figure 14B:
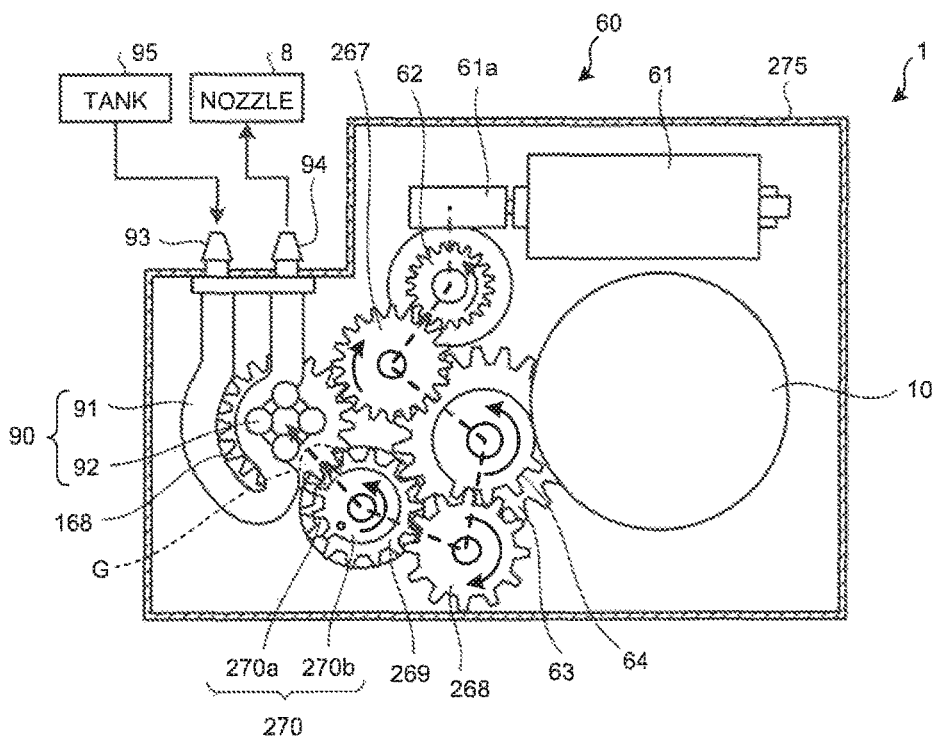
FIG. 14B is a top view illustrating the drive unit housed in the case seen from the upper side.
Figure 14C:
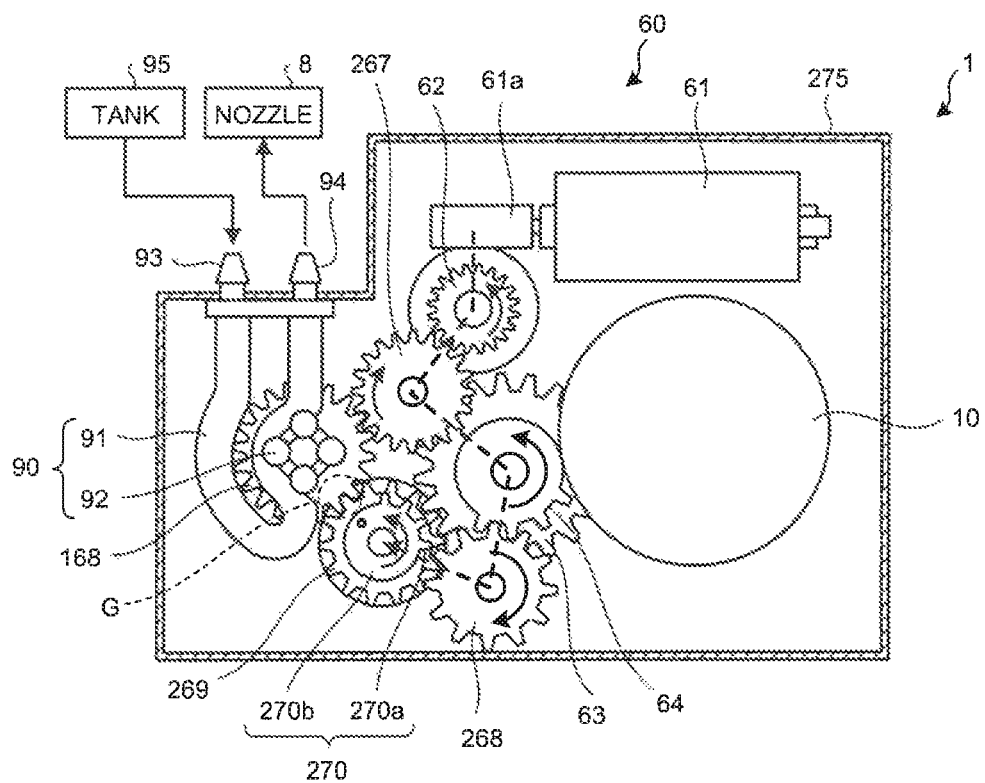
FIG. 14C is a top view illustrating the drive unit housed in the case seen from the upper side.

Hereinafter, a configuration of the drive unit 60 and operations of the drive unit 60 according to the fourth embodiment will be explained with reference to FIGS. 14A to 14C. FIGS. 14A to 14C are top views illustrating the drive unit 60 housed in a case 275 seen from the upper side.

The drive unit 60 according to the fourth embodiment includes gears 267, 268, 269, and a second chipped-tooth gear 270 in addition to the above electric motor 61, the gears 62, 63, the chipped-tooth gear 64, the vane gear 65 (hidden in FIG. 14A), the torsion spring 66 (hidden in FIG. 14A), and the ejector gear 168.

As illustrated in FIG. 14A, the gear 267 is engaged with the gear 62 and the gear 63. The gear 268 is engaged with the chipped-tooth gear 64 and the gear 269.

Figure 15:
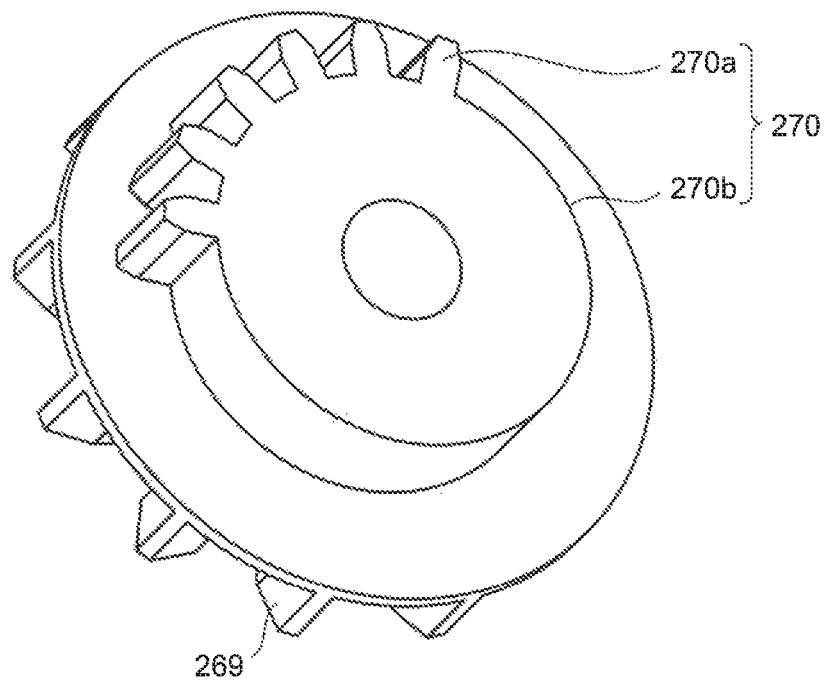
FIG. 15 is an enlarged perspective view illustrating a gear.

FIG. 15 is an enlarged perspective view illustrating the gear 269. As illustrated in FIGS. 14A and 15, the gear 269 is arranged coaxially with the second chipped-tooth gear 270 and configured to be integrated with the second chipped-tooth gear 270. Therefore, when the gear 269 is rotated, the second chipped-tooth gear 270 is rotated in the same direction in accordance therewith.

The second chipped-tooth gear 270 includes an engaging part 270a and a toothless part 270b. The engaging part 270a is a part that can be engaged with the ejector gear 168. The toothless part 270b is a part that is not engaged with the ejector gear 168.

A rotation direction of the electric motor 61 is assumed to be one direction. Therefore, when a driving force of the electric motor 61 is transmitted to the vane gear 65 through the gear 62, the gear 267, the gear 63, and the chipped-tooth gear 64, the air compressing unit 10 is driven so as to eject compressed air to the camera 100.

A driving force, which is transmitted to the chipped-tooth gear 64, is transmitted to the second chipped-tooth gear 270 through the gear 268 and the gear 269. In each of FIGS. 14A to 14C, for convenience of understanding, a position where the ejector gear 168 and the engaging part 270a of the second chipped-tooth gear 270 are engaged with each other is indicated by a dashed-line closed curve G.

When the second chipped-tooth gear 270 is rotated by the transmitted driving force and the engaging part 270a is positioned where the engaging part 270a is engaged with the ejector gear 168 in the position of the closed curve G, the ejector gear 168 rotationally drives the rollers 92 so as to eject a wash fluid to the camera 100 (see FIG. 14B).

When the second chipped-tooth gear 270 is rotated by the transmitted driving force and the toothless part 270b is positioned where the toothless part 270b is opposed to the ejector gear 168, the rollers 92 is not rotated, and thus wash fluid is not ejected to the camera 100 (see FIG. 14C). In this manner, the wash-fluid ejector 90 is intermittently driven by the second chipped-tooth gear 270.

Therefore, in the chipped-tooth gear 64 and the second chipped-tooth gear 270, when the number of the teeth or the length of an outer periphery surface of the engaging part 64a or 270a is changed, for example, an operation for ejecting a wash fluid at one time after three-time ejection of compressed airs can be set. Therefore, in the extraneous-matter removing apparatus 1, ejection timings of compressed air and a wash fluid are appropriately set in accordance with an environment in which the camera 100 is provided, so that it is possible to effectively remove an extraneous matter.

The drive unit 60 according to the fourth embodiment is configured to include the second chipped-tooth gear 270 configured as described above. Thus, in the fourth embodiment, by employing a simple configuration using the electric motor 61 whose rotation direction is set to be one direction, it is possible to drive both the air compressing unit 10 and the wash-fluid ejector 90. The remaining effects are similar to those of the above embodiments.

In the aforementioned embodiments, the number of the vanes 40 and the number of the cylinder chambers 21 segmented by the walls 30 are specifically described, however, they are merely one example and not limited thereto.

In the aforementioned, an example is described, in which the extraneous-matter removing apparatus 1 is applied to the camera 100 for vehicle, not limited thereto, the extraneous-matter removing apparatus 1 may be applied to a camera (optical sensor) having another type, such as a monitoring camera and a security camera provided within and without a building, at an alley, or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An extraneous-matter removing apparatus for removing extraneous matter attached to an optical sensor, the apparatus comprising:
   an air compressing unit that includes:
      a cylinder; and
      a rotating body that is provided in the cylinder to be rotatable around a rotation axis, wherein
      the air compressing unit ejects compressed air generated by rotation of the rotating body to the optical sensor,
   the cylinder includes:
      a cylinder chamber that is cylindrically formed and houses therein the rotating body; and
      a wall that is formed along a radial direction of the cylinder chamber to segment the cylinder chamber, and air between the rotating body and the wall in the cylinder chamber is compressed by the rotating body rotating around the rotation axis toward the wall to generate the compressed air.

2. The extraneous-matter removing apparatus according to claim 1, wherein the air compressing unit ejects the compressed air in a direction of the rotation axis of the rotating body.

3. The extraneous-matter removing apparatus according to claim 2, wherein the air compressing unit includes a first flow path that is formed in the cylinder along the rotation axis of the rotating body and through which the compressed air flows.

4. The extraneous-matter removing apparatus according to claim 2, wherein
the cylinder further includes:
a second flow path that is formed on a ceiling surface of the cylinder and through which the compressed air flows; and
a communication opening that is arranged near the wall on the ceiling surface of the cylinder and via which the cylinder chamber and the second flow path communicate with each other, wherein
the compressed air generated in the cylinder chamber flows into the second flow path through the communication opening and is ejected from the second flow path to the optical sensor.

5. The extraneous-matter removing apparatus according to claim 2, further comprising
a drive unit that rotationally drives the rotating body, wherein
the drive unit includes:
a drive source;
a rotating-body gear that is connected with the rotating body to rotate, when a driving force is transmitted from the drive source, the rotating body in one direction;
a biasing part that biases the rotating body to rotate the rotating body in another direction; and
a first chipped-tooth gear that includes (i) an engaging part that is able to be engaged with the rotating-body gear and (ii) a toothless part that is not engaged with the rotating-body gear, the first chipped-tooth gear being connected with the drive source, and
the rotating body is rotated in the one direction against a biasing force of the biasing part, when the engaging part of the first chipped-tooth gear is positioned at a position at which the engaging part is engaged with the rotating-body gear, so as to expand a room between the rotating body and the wall in the cylinder, and is rotated in the other direction by the biasing force of the biasing part, when the toothless part of the first chipped-tooth gear is positioned at a position at which the toothless part faces the rotating-body gear, so as to compress the expanded room.

6. The extraneous-matter removing apparatus according to claim 2, wherein
the air compressing unit further includes one or more rotating bodies, and
the rotating bodies are arranged to be rotational symmetry when the rotating bodies are seen from a direction along the rotation axis.

7. The extraneous-matter removing apparatus according to claim 2, further comprising:
a wash-fluid ejector that ejects a wash fluid to the optical sensor; and
a drive unit that drives both of the rotating body and the wash-fluid ejector.

8. The extraneous-matter removing apparatus according to claim 1, wherein the air compressing unit includes a first flow path that is formed in the cylinder along the rotation axis of the rotating body and through which the compressed air flows.

9. The extraneous-matter removing apparatus according to claim 8, wherein
the first flow path includes:
an inlet that is formed close to a bottom surface of the cylinder and into which the compressed air flows; and
an outlet that is formed close to a ceiling surface of the cylinder and from which the compressed air flows.

10. The extraneous-matter removing apparatus according to claim 1, wherein
the cylinder further includes:
a second flow path that is formed on a ceiling surface of the cylinder and through which the compressed air flows; and
a communication opening that is arranged near the wall on the ceiling surface of the cylinder and via which the cylinder chamber and the second flow path communicate with each other, wherein
the compressed air generated in the cylinder chamber flows into the second flow path through the communication opening and is ejected from the second flow path to the optical sensor.

11. The extraneous-matter removing apparatus according to claim 1, wherein
the air compressing unit further includes one or more rotating bodies, and
the rotating bodies are arranged to be rotational symmetry when the rotating bodies are seen from a direction along the rotation axis.

12. An extraneous-matter removing apparatus for removing extraneous matter attached to an optical sensor, the apparatus comprising:
an air compressing unit that includes:
a cylinder; and
a rotating body that is provided in the cylinder to be rotatable around a rotation axis; and
a drive unit that rotationally drives the rotating body, wherein
the air compressing unit ejects compressed air generated by rotation of the rotating body to the optical sensor,
the drive unit includes:
a drive source;
a rotating-body gear that is connected with the rotating body to rotate, when a driving force is transmitted from the drive source, the rotating body in one direction;
a biasing part that biases the rotating body to rotate the rotating body in another direction; and
a first chipped-tooth gear that includes (i) an engaging part that is able to be engaged with the rotating-body gear and (ii) a toothless part that is not engaged with the rotating-body gear, the first chipped-tooth gear being connected with the drive source, and
the rotating body is rotated in the one direction against a biasing force of the biasing part, when the engaging part of the first chipped-tooth gear is positioned at a position at which the engaging part is engaged with the rotating-body gear, so as to expand a room between the rotating body and the wall in the cylinder, and is rotated in the other direction by the biasing force of the biasing part, when the toothless part of the first chipped-tooth gear is positioned at a position at which the toothless part faces the rotating-body gear, so as to compress the expanded room.

13. An extraneous-matter removing apparatus for removing extraneous matter attached to an optical sensor, the apparatus comprising:
- an air compressing unit that includes:
  - a cylinder; and
  - a rotating body that is provided in the cylinder to be rotatable around a rotation axis;
- a wash-fluid ejector that ejects a wash fluid to the optical sensor; and
- a drive unit that drives both of the rotating body and the wash-fluid ejector, wherein
- the air compressing unit ejects compressed air generated by rotation of the rotating body to the optical sensor.

14. The extraneous-matter removing apparatus according to claim 13, wherein
the drive unit includes:
- a drive source; and
- a planetary gear that switches between (i) a rotating-body transmission path for transmitting a driving force from the drive source to the rotating body and (ii) a wash-fluid-ejector transmission path for transmitting the driving force from the drive source to the wash-fluid ejector.

15. The extraneous-matter removing apparatus according to claim 13, wherein
the drive unit includes:
- a drive source;
- an ejector gear that is connected with the wash-fluid ejector and rotates, when a driving force of the drive source is transmitted, to drive the wash-fluid ejector; and
- a second chipped-tooth gear that includes (i) an engaging part that is able to be engaged with the ejector gear and (ii) a toothless part that is not engaged with the ejector gear, the second chipped-tooth gear being rotated by the driving force of the drive source, and
the wash-fluid ejector that ejects, when the engaging part of the second chipped-tooth gear is positioned at a position at which the engaging part is engaged with the ejector gear, the wash fluid to the optical sensor, and does not eject, when the toothless part of the second chipped-tooth gear is positioned at a position at which the toothless part faces the ejector gear, the wash fluid to the optical sensor.

\* \* \* \* \*